US009767099B2

(12) United States Patent
Teytelman et al.

(10) Patent No.: US 9,767,099 B2
(45) Date of Patent: Sep. 19, 2017

(54) SYSTEM AND METHOD FOR DYNAMIC INTERACTION WITH A RESEARCH PUBLICATION DATABASE

(71) Applicant: ZappyLab, Inc., Kensington, CA (US)

(72) Inventors: Lenoid Teytelman, Cambridge, MA (US); Alexei Stoliartchouk, Kensington, CA (US); Matthew Davis, Oakland, CA (US)

(73) Assignee: ZappyLab, Inc., Kensington, CA (US)

( * ) Notice: Subject to any disclaimer, the term of this patent is extended or adjusted under 35 U.S.C. 154(b) by 158 days.

(21) Appl. No.: 14/485,271

(22) Filed: Sep. 12, 2014

(65) Prior Publication Data

US 2015/0074042 A1    Mar. 12, 2015

Related U.S. Application Data

(60) Provisional application No. 61/877,177, filed on Sep. 12, 2013, provisional application No. 61/923,468, filed on Jan. 3, 2014.

(51) Int. Cl.
*G06F 17/30*    (2006.01)
*G06F 7/00*     (2006.01)

(52) U.S. Cl.
CPC .............. *G06F 17/30011* (2013.01)

(58) Field of Classification Search
USPC ........................................................ 707/608
See application file for complete search history.

(56) References Cited

U.S. PATENT DOCUMENTS

| 6,094,654 A * | 7/2000 | Van Huben ....... G06F 17/30289 |
| 2010/0017383 A1* | 1/2010 | Gaucas ............. G06F 17/30899 |
| | | 707/E17.014 |
| 2012/0191545 A1* | 7/2012 | Leibu ..................... G06Q 30/02 |
| | | 705/14.66 |
| 2013/0130219 A1* | 5/2013 | Elzinga .................... G09B 7/00 |
| | | 434/362 |
| 2013/0166383 A1* | 6/2013 | Jermyn .................. G06Q 30/02 |
| | | 705/14.56 |

* cited by examiner

*Primary Examiner* — Kuen Lu
(74) *Attorney, Agent, or Firm* — Gary J. Gershik; Cooper & Dunham LLP

(57) ABSTRACT

Systems, apparatus, and methods are provided for providing dynamic interaction with a research publication database.

20 Claims, 17 Drawing Sheets

Figure 9

SYSTEM AND METHOD FOR DYNAMIC INTERACTION WITH A RESEARCH PUBLICATION DATABASE

CROSS REFERENCE TO RELATED APPLICATIONS

This application claims priority to U.S. Provisional Application No. 61/923,468, field Jan. 3, 2014, and claims priority to U.S. Provisional Application No. 61/877,177, filed Sep. 12, 2013, the contents of each of which are hereby incorporated by reference into the subject application in their entireties.

TECHNICAL FIELD

This disclosure relates to tools (systems, apparatuses, methodologies, computer program products, etc.) for dynamic interaction with a research publication database.

BACKGROUND

The ability to search, organize and discover research materials is essential for researchers, but can be a time-consuming and daunting task with the vast amount of information that is available in different locations. For example, for any given project, researchers may periodically run independent searches for new papers, for example, from separate labs and/or may scan tables of contents for different journals, where each journal resides in a separate location. This is not only a time consuming process, but the results of these searches may not be easy to search and organize given the large volume of research materials that may be located in each of the different locations. For example, the PDF files of many papers of interest may not be accessible to researchers because a subscription may be required, which, for example, may only be accessible on a particular stand alone computer at a researcher's office. Having separate subscription services for different libraries makes the management of papers of interest an extremely arduous task.

In addition, the static nature of the published materials, the strict nature of the publication and/or length limits makes it impossible to modify, annotate or share additional information relating to the published materials. For example, there may be corrections, additions or optimizations of the published materials that also exist in separate and different locations.

Moreover, it is not uncommon for an individual engaged in research to encounter questions relating to topics that are best answered by a scientific advisor or mentor. However, it is often difficult to obtain an advisor or mentor who is willing and able to answer the individual's specific questions. In addition, individuals asking questions may not want their identity to be known.

While some attempts have been made in the industry to create a research library organization tool, none successfully provide users with a centralized resource for article discovery, management, and author-annotation and communication. In addition, none of these research library organization tools provide users with access to readily available scientific advisors or mentors.

For example, Mendeley (mendeley.com, owned by Elsevier publisher) is a reference management website for researchers. Mendeley has an iOS application that is synchronized with Mendeley's online database, a social network component with shared user libraries, and a recommendation engine based on a user library. However, Mendeley's iOS application does not offer an Android application. Further, Mendeley does not offer a research publication database that can collect research publications from third party sources, nor does it provide users with the ability to search external databases. Instead, the only articles available on Mendeley are those uploaded by users directly to the Mendeley database. Hence, Mendeley falls short of serving as a comprehensive research database. Also, Mendeley cannot function as a central article-annotation and author-communication platform.

As another example, Papers (developed by Mekentosj, owned by Springer publisher) is a standalone reference manager for the PC, Mac, and iOS devices. Papers allows a user to synchronize his or her library between an iOS device and a personal computer. Papers also enables a user to search external databases. However, Papers does not offer an Android application, nor does it operate on a website. Rather, users of Papers can only store articles on their devices locally. Thus, because Papers does not offer an online library system, the Papers application cannot enable communication among users' libraries, nor can it support an online communication platform for commentary relating to the articles.

As yet another example, Readcube (readcube.com, part of Digital Science, a division of Macmillan Publishers/Nature Publishing Group) is a standalone reference manager for the PC and Mac. It provides library-based user recommendations and allows users to search external databases. However, Readcube does not offer an Android application, an iOS application, or a website. Thus, not only does Readcube fail to enable communication among users' libraries or support an online communication platform, Readcube users are unable to synchronize their user libraries between devices.

In addition to development of research library organization tools, attempts have been made at providing question and answer forums for those individuals looking for a virtual space to obtain quick responses. For example, Twitter provides a crowd-sourced advice outlet for users to reach out to specific individuals. However, on Twitter a new user does not have followers and questions are invisible. Twitter users do not have a means of searching previously posted questions and answers. In addition, Twitter lacks anonymity, and questions and answers are constrained to 140 characters.

Another example of a virtual question and answer forum for scientists is ResearchGate (hereafter "RG"). RG provides a social networking platform for scientists, however, like Twitter, it lacks anonymity. In addition, while RG provides a means for users to identify the "best" answers, RG does not control who answers each question. That is, there is no way of knowing whether answers are coming from trusted scientific advisors or mentors.

Accordingly, there is a need for an improved research library organization tool that allow researchers to search, organize, modify, discuss and discover research publications, while providing a forum for researchers obtain valuable knowledge from scientific advisors and/or mentors.

SUMMARY

Various tools (for example, a system, an apparatus, application software, etc.) can be configured to enable dynamic interaction with a research publication database.

In an aspect of this disclosure, a research publication library management system is provided. The research publication library management system may comprise: a library management apparatus for communicating through a network with a terminal operable by one or more users, the terminal including a first non-transitory medium embodying an application and a processor for executing the application, wherein the library management apparatus includes a second non-transitory medium embodying one or more programs of instructions executable by one or more processing units in the library management apparatus to configure the library management apparatus to comprise: a user account part that creates one or more user accounts associated with the one or more users; a publication collection part that creates a research publication database by at least one of storing research publications or linking to third party sources that include the research publications; an author essay part for allowing the one or more users or one or more authors of the research publications to provide one or more author essays relating to at least one of the research publications and storing the one or more author essays in the research publication database, wherein each of the one or more essays is stored in association with at least one of the research publications; a search part that allows the one or more users to search the research publication database and retrieves one or more search results related to both the research publications and the related one or more author essays; and a library management part for managing one or more user libraries associated with the one or more users, wherein the research publications and the one or more author essays are storable in the one or more user libraries.

In another aspect, the library management apparatus comprises a search results configuration part for determining a sequence of the retrieved one or more search results for display to a user interface, wherein each user of the one or more users has a separate library that contains a plurality of research publications having a plurality of features associated therewith, wherein each of the plurality of research publications is associated with at least one of the plurality of features, and
wherein for each user of the one or more users, the sequence is determined based on at least one feature of the plurality of features associated with the plurality of research publications in the user's library.

In another aspect, the one or more users comprises a first user associated with a first library and a second user associated with a second library, wherein the library management apparatus comprises a community part for providing the first user access to the second library for at least one of viewing content stored in the second library, copying content stored in the second library for storage to the first library, or downloading content stored in the second library to the first library, wherein the first library contains a first plurality of research publications associated with a first plurality of features and the second library contains a second plurality of research publications associated with a second plurality of features, and wherein the access is provided based on determining that a predetermined amount of the first plurality of features at least one of match, correspond to, or are associated with the second plurality of features.

In another aspect, the one or more users comprises a first user associated with a first library containing a first plurality of research publications associated with a first plurality of features, wherein the library management apparatus comprises a recommendation part for: determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features, determining that a research publication of the second plurality of research publications is contained in a predetermined amount of the plurality of second libraries and is not contained in the first library, and recommending the research publication to the first user.

In another aspect, one or more of the second plurality of features that match, correspond to, or are associated with the first plurality of features are related to at least one of authors of research publications or authors of author essays stored in the first library.

In another aspect, each user of the one or more users has a separate library that contains a plurality of research publications having a plurality of features associated therewith, wherein the library management apparatus further includes a moderation part for allowing the one or more users to link at least one comment to an author essay of the one or more author essays associated with at least one research publications in the research publication database, wherein the moderation part is configured to: determine a first plurality of features associated with the research publication in the research publication database and associated with the author essay, for each user of the one or more users, determine a second plurality of features associated with the plurality of research publications contained in the user's library, and allow the user to link a comment based on determining that a predetermined amount of second features at least one of match, correspond to, or are associated with the first plurality of features.

In another aspect, the moderation part provides the one or more users or the one or more authors of the author essay the ability to control visibility of the linked at least one comment on a moderation interface. Additionally, in another aspect, the library management system may comprise an advisory part for allowing the one or more users to post questions and answers to the questions. The advisory part may be configured to store the questions and answers in a database and may be configured to allow the one or more users to search for the questions and answers in the database.

In another aspect of this disclosure, a library management application is provided. The library management application may include one or more programs of computer-executable instructions embodied in a non-transitory computer-readable medium and executable by a processing unit of a terminal apparatus, to configure the terminal apparatus to include: a user account functionality for creating one or more user accounts associated with one or more users; an author essay functionality for allowing the one or more users or one or more authors of research publications stored in a research publication database to provide one or more author essays relating to at least one of the research publications and storing the one or more author essays in the research publication database, wherein each of the one or more author essays is stored in association with at least one of the research publications; a search functionality for searching the research publication database and retrieving one or more search results related to both the research publications and the related one or more author essays; and a library management functionality for managing one or more user libraries associated with the one or more users, wherein the research publications and the one or more author essays are storable in the one or more user libraries.

In another aspect, the library management applications comprises a search results configuration functionality for determining a sequence of the retrieved one or more search results for display to a user interface, wherein each user of the one or more users has a separate library that contains a plurality of research publications having a plurality of features associated therewith, wherein each of the plurality of research publications is associated with at least one of the plurality of features, and wherein for each user of the one or more users, the sequence is determined based on at least one feature of the plurality of features associated with the plurality of research publications in the user's library.

In another aspect, the one or more users comprises a first user associated with a first library and a second user associated with a second library, wherein the library management application comprises a community library functionality for providing the first user access to the second library for at least one of viewing content stored in the second library, copying content stored in the second library for storage to the first library, or downloading content stored in the second library to the first library, wherein the first library contains a first plurality of research publications associated with a first plurality of features and the second library contains a second plurality of research publications associated with a second plurality of features, and wherein the access is provided based on determining that a predetermined amount of the first plurality of features at least one of match, correspond to, or are associated with the second plurality of features.

In another aspect, the one or more users comprises a first user associated with a first library containing a first plurality of research publications associated with a first plurality of features, wherein the library management application comprises a recommendation part for: determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features, determining that a research publication of the second plurality of research publications is contained in a predetermined amount of the plurality of second libraries and is not contained in the first library, and recommending the research publication to the first user.

In another aspect, one or more of the second plurality of features that match, correspond to, or are associated with the first plurality of features are related to at least one of authors of research publications or authors of author essays stored in the first library.

In another aspect, each user of the one or more users has a separate library that contains a plurality of research publications having a plurality of features associated therewith, wherein the library management application further includes a moderation functionality for allowing the one or more users to link at least one comment to an author essay of the one or more author essays associated with at least one research publications in the research publication database, wherein the moderation functionality is configured to: determine a first plurality of features associated with the research publication in the research publication database and associated with the author essay, for each user of the one or more users, determine a second plurality of features associated with the plurality of research publications contained in the user's library, and allow the user to link a comment based on determining that a predetermined amount of second features at least one of match, correspond to, or are associated with the first plurality of features.

In another aspect, the moderation functionality provides the one or more users or the one or more authors of the author essay the ability to control visibility of the linked at least one comment on a moderation interface. In another aspect, the library management application may comprise an advisory functionality for allowing the one or more users to post questions and answers to the questions. The advisory functionality may allow users to provide feedback to previously-posted answers, and the feedback may be a quality score.

In another aspect of this disclosure, a method is provided. The method may be performed by a library management application executing in a library publication management system including one or more processing units, said method comprising: creating one or more user accounts associated with one or more users, wherein a library is associated with each of the one or more users; receiving one or more author essays from one or more users or one or more authors of research publications; storing the one or more author essays in a research publication database, wherein each of the one or more author essays is stored in association with at least one of the research publications; allowing the one or more users to search the research publication database; retrieving one or more search results related to both the research publications and the one or more author essays.

In another aspect, the method comprises determining a sequence of the retrieved one or more search results for display to a user interface, wherein each user of the one or more users has a separate library that contains a plurality of research publications having a plurality of features associated therewith, wherein each of the plurality of research publications is associated with at least one of the plurality of features, and wherein for each user of the one or more users, the sequence is determined based on at least one feature of the plurality of features associated with the plurality of research publications in the user's library.

In another aspect, the one or more users comprise a first user associated with a first library and a second user associated with a second library, wherein the method further comprises providing the first user access to the second library for at least one of viewing content stored in the second library, copying content stored in the second library for storage to the first library, or downloading content stored in the second library to the first library, wherein the first library contains a first plurality of research publications associated with a first plurality of features and the second library contains a second plurality of research publications associated with a second plurality of features, and wherein the access is provided based on determining that a predetermined amount of the first plurality of features at least one of match, correspond to, or are associated with the second plurality of features.

In another aspect, the one or more users comprises a first user associated with a first library containing a first plurality of research publications associated with a first plurality of features, wherein the method further comprises: determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features, determining that a research publication of the second plurality of research publications is contained in a predetermined amount of the plurality of second libraries and is not contained in the first library, and recommending the research publication to the first user.

In another aspect, one or more of the second plurality of features that match, correspond to, or are associated with the first plurality of features are related to at least one of authors of research publications or authors of author essays stored in the first library.

In another aspect, each user of the one or more users has a separate library that contains a plurality of research publications having a plurality of features associated therewith, wherein the method comprises: allowing the one or more users to link at least one comment to an author essay of the one or more author essays associated with at least one research publications in the research publication database, wherein the allowing is based on: determine a first plurality of features associated with the research publication in the research publication database and associated with the author essay, for each user of the one or more users, determining a second plurality of features associated with the plurality of research publications contained in the user's library, and determining that a predetermined amount of second features at least one of match, correspond to, or are associated with the first plurality of features.

In another aspect, the method comprises providing the one or more users or the one or more authors of the author essay the ability to control visibility of the linked at least one comment on a moderation interface. In another aspect, the method includes the step of providing the one or more users the ability to post one or more questions and one ore more answers to the one or more questions, providing the one or more users the ability to assign a quality score to each answer, and calculating an overall quality score for each answer and displaying each answer by descending quality score. The method may provide the one or more users the ability to post the one or more questions or the one or more answers to the one or more questions anonymously.

In another aspect of the disclosure, another method is provided. The method may be a computer-implemented method for providing a virtual scientific mentor. The method may include the steps of creating one or more user accounts associated with one or more users, designating as scientific mentors at least one of the one or more users based on their qualifications, allowing the one or more users to anonymously submit one or more questions at least one of the one or more designated scientific mentors, allowing at least one of the one or more designated scientific mentors to answer the one or more questions, and allowing the one or more users to provide feedback regarding content of the one or more submitted answers.

In another aspect, the method may include one or more of the following features: the selected scientific mentors include at least one of a professor, a post-doc, a student, and an industry scientist; the method may include the step of providing information about the one or more selected scientific mentors to the one or more users; allowing the one or more users to provide feedback may include allowing the one or more users to assign at least one quality score to each of the one or more submitted answers; the at least one quality score may correspond to at least one characteristic of each of the one or more submitted answers; the method may include the step of calculating an overall quality score for each of the one or more submitted answers and displaying each answer by descending quality score; the at least one quality score may include at least one of a number on a scale and a selected number of characters; and the at least one quality score may be a plurality of quality scores and each of the plurality of quality scores may correspond to a plurality of characteristics of each of the one or more submitted answers.

In another aspect of the disclosure, a non-transitory computer readable medium is provided. The non-transitory computer readable medium may include computer readable instructions stored therein that when executed by a processing circuit perform a method for providing a virtual scientific mentor. The method for providing the virtual scientific mentor may include the steps of creating one or more user accounts associated with one or more users, designating as scientific mentors at least one of the one or more users based on their qualifications, allowing the one or more users to anonymously submit one or more questions to at least one of the one or more designated scientific mentors, allowing at least one of the one or more designated scientific mentors to answer the one or more questions, and allowing the one or more users to provide feedback regarding content of the one or more submitted answers.

In another aspect, the non-transitory computer readable medium may include one or more of the following features: the designated scientific mentors may include at least one of a professor, a post-doc, a student, and an industry scientist; the method may further comprise providing information about the one or more designated scientific mentors to the one or more users; allowing the one or more users to provide feedback may include allowing the one or more users to assign at least one quality score to each of the one or more submitted answers; the at least one quality score may correspond to at least one characteristic of each of the one or more submitted answers; the method may further comprise calculating an overall quality score for each of the one or more submitted answers and displaying each of the one or more submitted answers by descending quality score; the at least one quality score may include at least one of a number on a scale and a selected number of characters; and the at least one quality score may be a plurality of quality scores and each of the plurality of quality scores may correspond to a plurality of characteristics of each of the one or more submitted answers.

In another aspect of the disclosure a system is provided. The system may be for providing a virtual scientific mentor and may include a user account functionality for creating one or more user accounts associated with one or more users, a scientific mentor designating functionality for designating as scientific mentors at least one of the one or more users based on their qualifications, a commenting functionality for allowing the one or more users to anonymously submit one or more questions to at least one of the one or more designated scientific mentors and for allowing at least one of the one or more designated scientific mentors to answer the one or more questions, and a feedback functionality for allowing the one or more users to provide feedback regarding content of the one or more submitted answers.

In another aspect, the system may include one or more of the following features: the designated scientific mentors may include at least one of a professor, a post-doc, a student, and an industry scientist; the system may include a designated scientific mentor information functionality for providing information about the one or more designated scientific mentors to the one or more users; the feedback functionality may be configured to allow the one or more users to assign at least one quality score to each of the one or more submitted answers; the at least one quality score may correspond to at least one characteristic of each of the one or more submitted answers; the system may include a calculating functionality for calculating an overall quality score for each of the one or more submitted answers and displaying each of the one or more submitted answers by descending quality score; the at least one quality score may include at least one of a number on a scale and a selected number of characters; and the at least one quality score may be a plurality of quality scores and each of the plurality of quality scores may correspond to a plurality of characteristics of each of the one or more submitted answers.

BRIEF DESCRIPTION OF THE DRAWINGS

These and other features will be more clearly understood from the following detailed description taken in conjunction with the accompanying drawings and claims, wherein like reference numerals represent like parts.

FIG. 4 shows a sample screenshot of a user account screen, according to one embodiment of the disclosure.

FIG. 7 shows a sample screenshot of a library screen, according to one embodiment of the disclosure.

FIGS. 8a and 8b show sample screenshots of community library screens, according to one embodiment of the disclosure.

FIG. 9 shows a sample screenshot of a recommendation screen, according to one embodiment of the disclosure.

DETAILED DESCRIPTION

Figure 1:
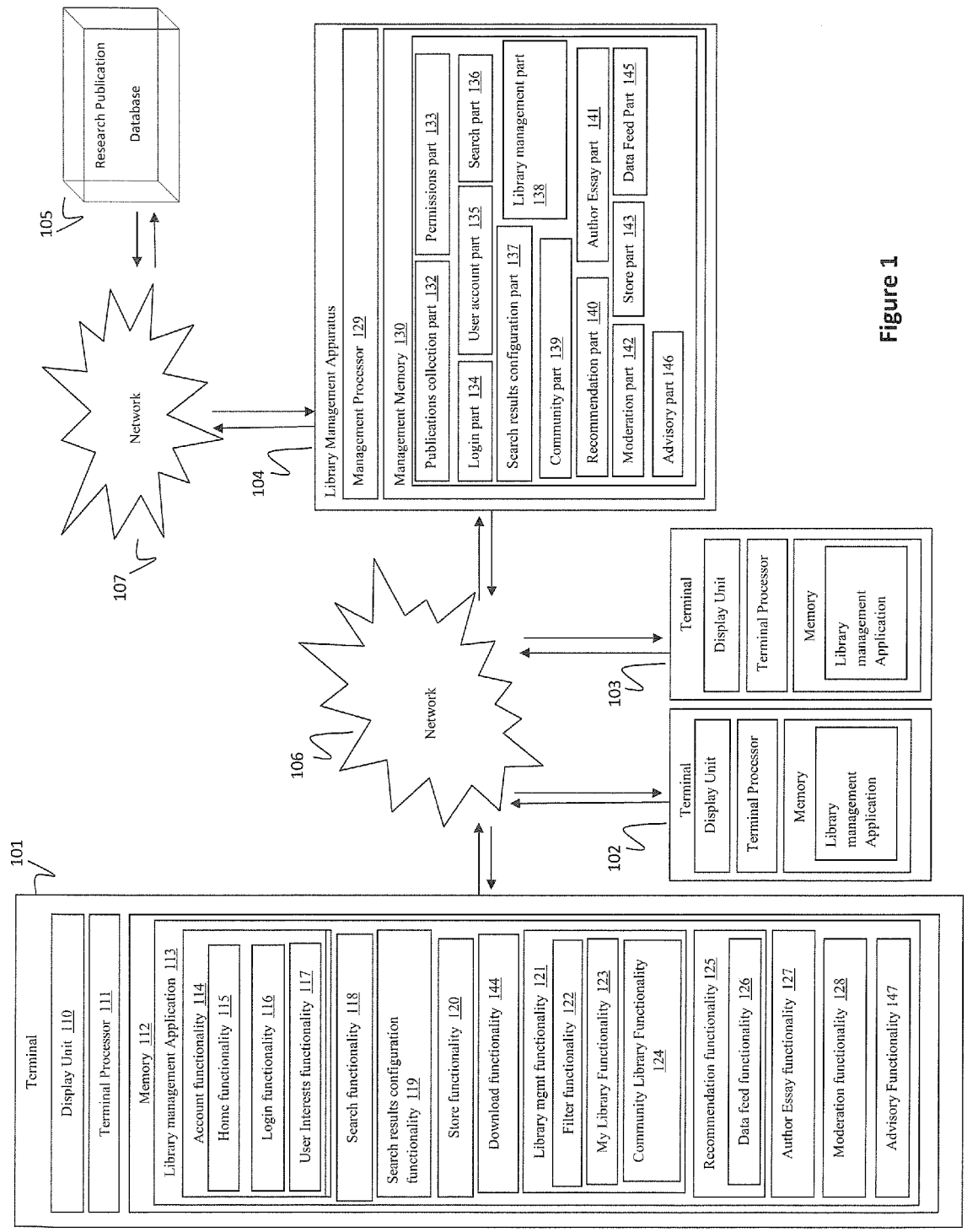
FIG. 1 is a block diagram of a data network comprising a system for dynamic interaction with a research publication database, according to one embodiment of the disclosure.

This disclosure provides tools (in the form of apparatuses, methodologies and systems) for facilitating research by dynamic interaction with a research publication database [105].

The systems and methods of the present disclosure provide a centralized resource for article discovery, management, and author-annotation and communication. The disclosed systems, methods, and applications provide a way to search, organize and discover research publications. According to an embodiment, content in a user's library, author or journal names associated with the content in a user's library, or various other criteria may be used to recommend relevant new publications to the user. A community feature may allow users to subscribe to libraries of colleagues and collaborators, with easy tracking of articles added by the other users in one's community feed. In this way, the present invention makes it possible to subscribe to other users with open libraries. The automated recommendations, combined with the social library feeds, provide a comprehensive mechanism to discover relevant research in an efficient and structured manner.

The disclosed systems, methods, and applications may also provide a search function, wherein search results are managed and sorted by relevance (with optional chronological sort), so that for a common name or term, a user will be presented with retrieved results based on their relevancy to the user (e.g an orthopedist is more likely to see results from orthopedic journals while a geneticist is more likely to see as the top hits papers from journals specializing in genetics).

The disclosed systems, methods, and applications may provide users with cloud storage of copies of the research publications, for example, in a PDF format, which is synchronized across mobile (e.g., iOS or Android) and web operating systems. For example, once a copy of a paper in PDF format is downloaded and added to a user's cloud, the user need not re-download a copy of the paper when the user changes terminals, since the PDF will be accessible to the user regardless of which terminal the user is using.

The disclosed systems, methods, and application may further provide a user with a sophisticated library management interface, allowing folder-like tagging of articles for organization and keyword searches of references by title, author, and journal.

According to an embodiment, the systems, methods and application provide authors of research publications a forum to share stories and essays that relate to their research articles, for example, personal stories that relate to the formal publication, including, but not limited to, the author's personal views and impressions about the research. This personalized mechanism allows readers to discover the interesting details that lie behind the formal research publication. Links to these stories and essays may be associated with the relevant research publication such that each time the article is shown as a result, the link is displayed therewith. As a result, a user, likely already interested in the work, is encouraged to read more about the work on a personal level. According to an embodiment, the author and readers are provided a mechanism by which he/she can promote the essay and stories associated with the research publication through email and/or social media websites.

According to another embodiment, an authoring tool is provided to allow one or more users and/or one or more authors to discuss the research publications through posts via a blog-like interface. In addition, a moderation tool is provided to allow one or more users and/or one or more authors to moderate and/or respond to comments and questions regarding the posts. By associating the research publications with the posts, the present disclosure provides a centralized communication platform and can effectively expose scientists' stories in a way that cannot be done by using conventional blogs or other social platforms.

In describing exemplary embodiments illustrated in drawings, specific terminology is employed for the sake of clarity. However, the subject matter of this patent specification is not intended to be limited to the specific terminology so selected and it is to be understood that each specific element includes all technical equivalents that operate in a similar manner.

The drawings show examples of implementations of the subject matter of this patent disclosure in several computing environments. In the present disclosure, the phrase "terminal" may be used to describe any computing device including but not limited to, mobile devices (PDAs, smartphones, cell phones, tablet computers, ebook readers, etc.), computers (laptop, desktop, gaming console, etc.), television displays (plasma, LCD, CRT, OLED, etc.), other information terminals, etc., including future technologies or applications enabling the same or similar results having sufficient input, storage, processing and output capabilities to execute one or more instructions as will be described in detail herein and as will be appreciated to those skilled in the relevant arts. In addition, the subject matter of this disclosure might be provided as services in a modular fashion by other devices connected by a communications network.

The term "server" generally refers to any one or more network connected devices configured to receive or transmit information, such as audio/visual content to and from any computing device and having sufficient input, storage, processing and output capabilities to execute one or more instructions as will be described in detail herein and as will be appreciated to those skilled in the relevant arts. For example, a "cloud server" may be provided which may not actually be a single server, but may be a collection of one or more servers acting together as a shared collection of storage and processing resources. Such collection of servers need not all be situated in the same geographic location and may advantageously be spread out across a large geographic region.

The term "database" as used in this application, is used to refer to storage, and generally refers to any one or more of apparatus, device, composition, and the like, capable of retaining information and/or program instructions for future use, copying, playback, execution and the like.

Referring now to the drawings, wherein like reference numerals designate identical or corresponding parts, throughout the several views, there is described tools (systems, apparatuses, methodologies, computer program products, etc.) for managing a database of research publications, retrieving contents of the database, and presenting the retrieved contents to a user in a customized manner. In addition, there is also described tools (systems, apparatuses, methodologies, computer program products, etc.) for allowing users to upload information relating to the one or more research publications, and associating the uploaded information with each of the one or more research publications, such that when the one or more research publications are presented to a user, the uploaded information is also presented as associated therewith.

FIG. 1 shows a block diagram of a system [100], according to one exemplary embodiment of the present disclosure. The system [100] may include a library management apparatus [104] and one or more terminals [101], [102], [103]. The library management apparatus [104] and terminals [101], [102], [103] may be interconnected by a network [106]. The library management apparatus [104] may also be interconnected, via a network [107], to at least one research publication database [105] so to provide the terminals [101], [102], [103] with access to at least one research publication database [105]. The library management apparatus [104] comprises a management processor [129], a memory [130], and programs of instructions stored in the memory [130] and executable by the management processor [129] for carrying out various functionalities. For example, the library management apparatus [104] may comprise a publication collection part [132] and a permission part [133] for creating a database [105] by collecting research publications from various sources, a library management part [138] capable of communicating with a terminal processor [111] of a terminal [101] for managing a user's library, a search part [136] for searching the research publication database [105], a search results configuration part [137] capable of configuring a list of retrieved search results for display to a user via a display unit [110] of the terminal [101], a recommendation part [140] for recommending research publications to a user, a community part [139] for interconnecting various users' libraries, an author essay part [141] for storing personal essays associated with research publications, and a moderation part [142] for providing a social platform to enable communication among an author and readers.

Each of the networks [106], [107] described herein can be a local area network, a wide area network or any type of network such as an intranet, an extranet (for example, to provide controlled access to external users, for example through the Internet), a private cloud or public cloud network, the Internet, etc., or a combination thereof. Further, other communication links (such as a virtual private network, a wireless link, etc.) may be used as well for the network 104. In addition, the network [106], [107] preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White (Que Corporation 1999), the entire contents of each of which are incorporated herein by reference. Although the networks [105], [106] are shown as two separate networks in the example of FIG. 1, they may both be represented by a single network.

The library management apparatus [104] may make the research publications available to the terminals [101], [102], [103]. The research publication database [105] provides a centralized location for all research publications and may be any kind of storage unit. In some embodiments, the research publication database [105] comprises a cloud-based database. The research publication database [105] may contain up to date publications in various disciplines (e.g., biomedical sciences, chemistry, medicine, physics, etc.). For example, a research publication may be authored by researchers who performed the research that is the subject of the publication, such as, a graduate student, a postdoctoral researcher, and/or a professor who contributed to the research, etc. According to an embodiment, the research publication database [105] may also contain the information and files uploaded by one or more users through one or more terminals [101], [102], [103]. According to another embodiment, the research publication database [105] may comprise information located in several other databases, such as, for example, NCBI Pubmed database, IEEE, GoogleScholar, arXiv, Scopus, etc. In other embodiments, the research publication database [105] comprises a connection or link to other databases, such that the information resides in third party databases and may be collected from those databases by the library management apparatus [104].

According to an embodiment, the library management apparatus [104] may comprise a publication collection part [132] for creating the research publication database [105] by at least one of collecting research publications or linking to third party sources that host the research publications. As such, the research publications may be collected from third party sources. For example, the research publication database [105] may link to research libraries, universities, archives, or any other type of source to obtain research publications. The library management apparatus [104] may comprise a permissions part [133], which may be used by apparatuses associated with third party sources for granting the library management apparatus [104] permission to collect research publications from the third party sources. The library management apparatus [104] may also include a research publication store part [143] comprising one or more structural or functional parts that have or support a storage function. For example, the research publication store part [143] can be, or can be a component of, a source of electronic data, such as a web server, a backend server connected to a web server, an e-mail server, a file server, a multi-function peripheral device (MFP or MFD), a voice data server, and application server, a computer, a network apparatus, a terminal, etc. It should be appreciated that the term "electronic document" or "electronic data", as used herein, in its broadest sense, can comprise any data that a user may wish to access, retrieve, review, etc. According to another embodiment, the research publications may be collected from one or more users of the system [100].

According to an embodiment, the library management apparatus [104] may comprise a library management part [138] for obtaining and promoting content from the one or more users of the system [100] through the one or more terminals [101], [102], [103] and a recommendation part [140] for recommending one or more research publications to the one or more users of the system [100]. For example, the recommendation part [140] may search the research publication database [105] for research publications associated with the research publications that are in a user's library and/or research publications associated with interest criteria specified by the user via a user interests functionality [117] of a library management application [113] running on a terminal [101].

While part of the discussion will be directed to features of an individual library management application [113] running on a terminal [101] of the one or more terminals [101], [102], [103], it will be appreciated that each of the one or more terminals [101], [102], [103] may include a library management application [113] similar to that discussed with reference to terminal [101]. Likewise, while only three terminals [101], [102], [103] are depicted in FIG. 1, one of ordinary skill in the art will appreciate that the one or more terminals may include any number of terminals while remaining within the scope of the current disclosure. According to an embodiment, the terminal [101] may include a terminal processor [111] and a display unit [110], wherein the terminal processor [111] executes a library management application [113] to cause the display unit [110] to display the screens described herein. The terminal [101] is further described infra with reference to FIG. 11.

The terminal [101] may be configured to execute a library management application [113] for allowing a user to manage a customized library containing content from the research publication database [105] and/or other sources. The library management application [113] may include a plurality of application functionalities including a search functionality [118] to communicate with the library management apparatus [104]' search part [136] and thereby search the research publication database [105], a search results configuration functionality [119] to present publications retrieved from the search in a customized sequence according to the user, a download functionality [144] to download files retrieved from the research publication database [105], and a library management functionality [121] for allowing a user to manage contents stored within his or her library.

Figure 2:
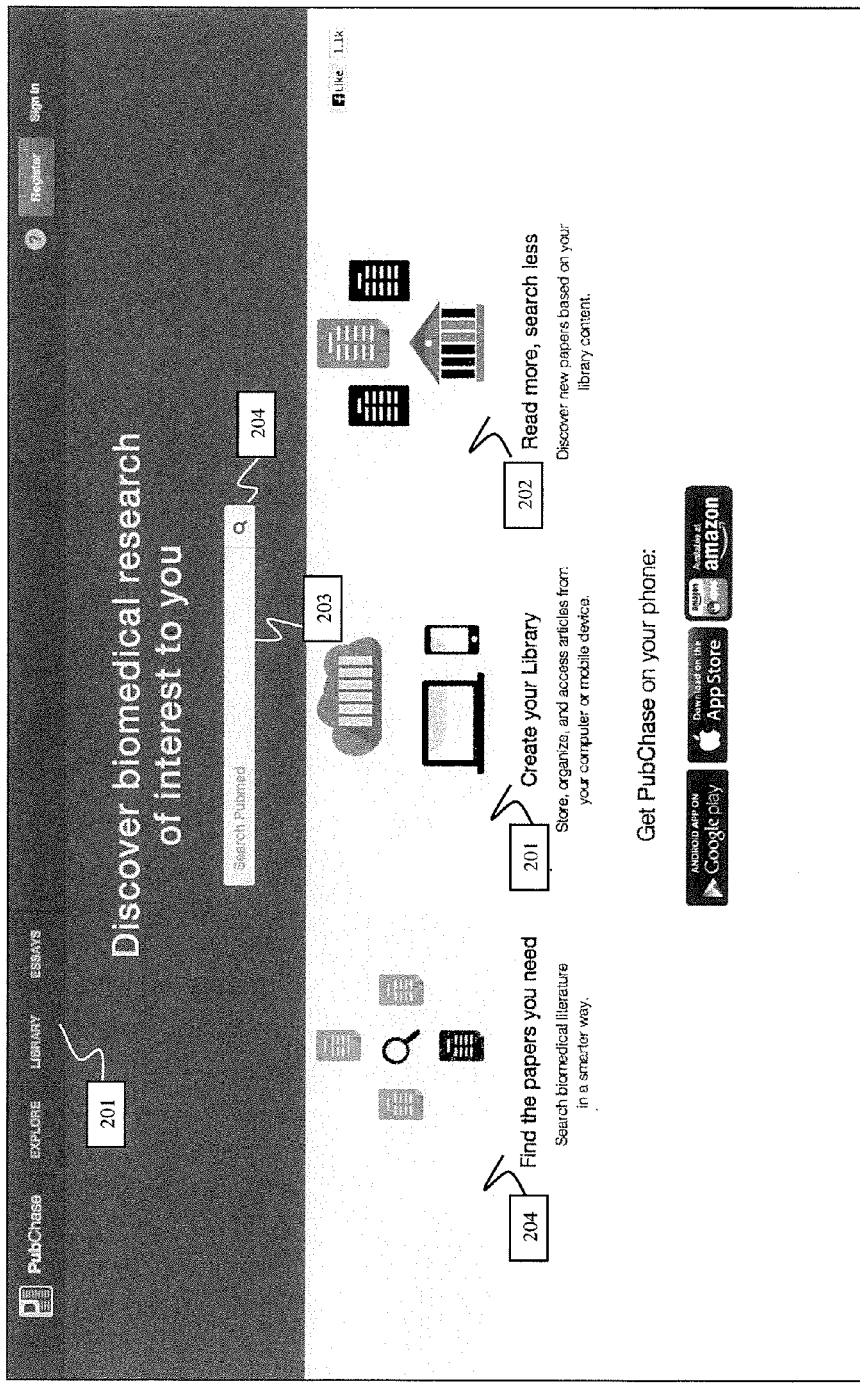
FIG. 2 shows a sample screenshot of a home screen, according to one embodiment of the disclosure.

According to an embodiment, the application may include a home functionality [115] for displaying a home screen. FIG. 2 depicts an embodiment of a terminal's screen [110] displaying a home screen [200], according to one embodiment. When a user first opens the library management application [113], the home screen [200] may be displayed for enabling the user to navigate through various functionalities of the library management application [113]. According to an embodiment, the home screen [200] may lead to various screens upon receiving user input. For example, activation of one or more library buttons [201] may cause the application [113] to display a user library screen [700], shown in FIG. 7 and further described below with reference thereto, and activation of a recommendation button [202] may cause the application [113] to display a recommendation screen [900], shown in FIG. 9 and further described below with reference thereto. In some embodiments, the home screen [200] may also include a search functionality [118]. For example, as shown in FIG. 2, the home screen [200] may include a search field [203] for receiving user search criteria input and a search button [204] for initiating a search of the research publication database [105] based on the user search criteria input. Additionally or alternatively, in some embodiments, the home screen [200] may include a search button that causes the application [113] to display a separate search screen providing the search functionality [118].

Figure 3:
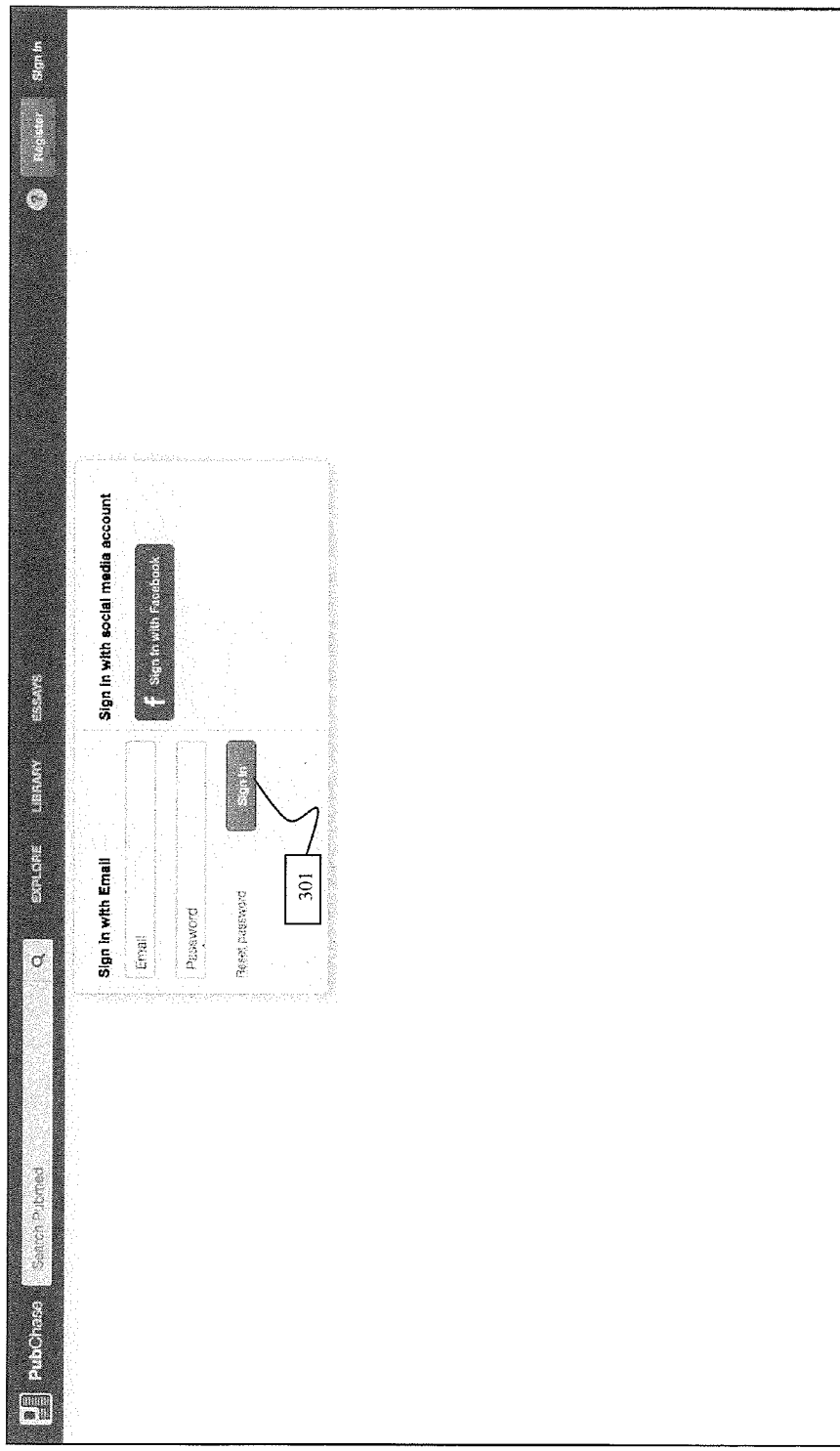
FIG. 3 shows a sample screenshot of a login screen, according to one embodiment of the disclosure.

FIG. 3 shows an example of a login screen [300] displayed to the user at the terminal [101]. The login screen [300] shown in FIG. 3 allows a user at the terminal [101] to enter account information, such as account name (e.g., an email address) and password of the user. The user at the terminal [101] can provide his or her account name and password and activate this feature, for example, by a "sign in" button [301] to be authenticated, for example, either as a regular user or as an administrative user. If a user is a first-time user, the login screen [300] may direct the user to a registration page (not shown). Through the registration page, the user may input login information such as a chosen screen name and password. Such information may be transmitted to the library management apparatus [104] through the network [106] and stored, and may thereafter be usable by the library management apparatus [104] to verify the user and allow the user access to his or her account.

Figure 4:
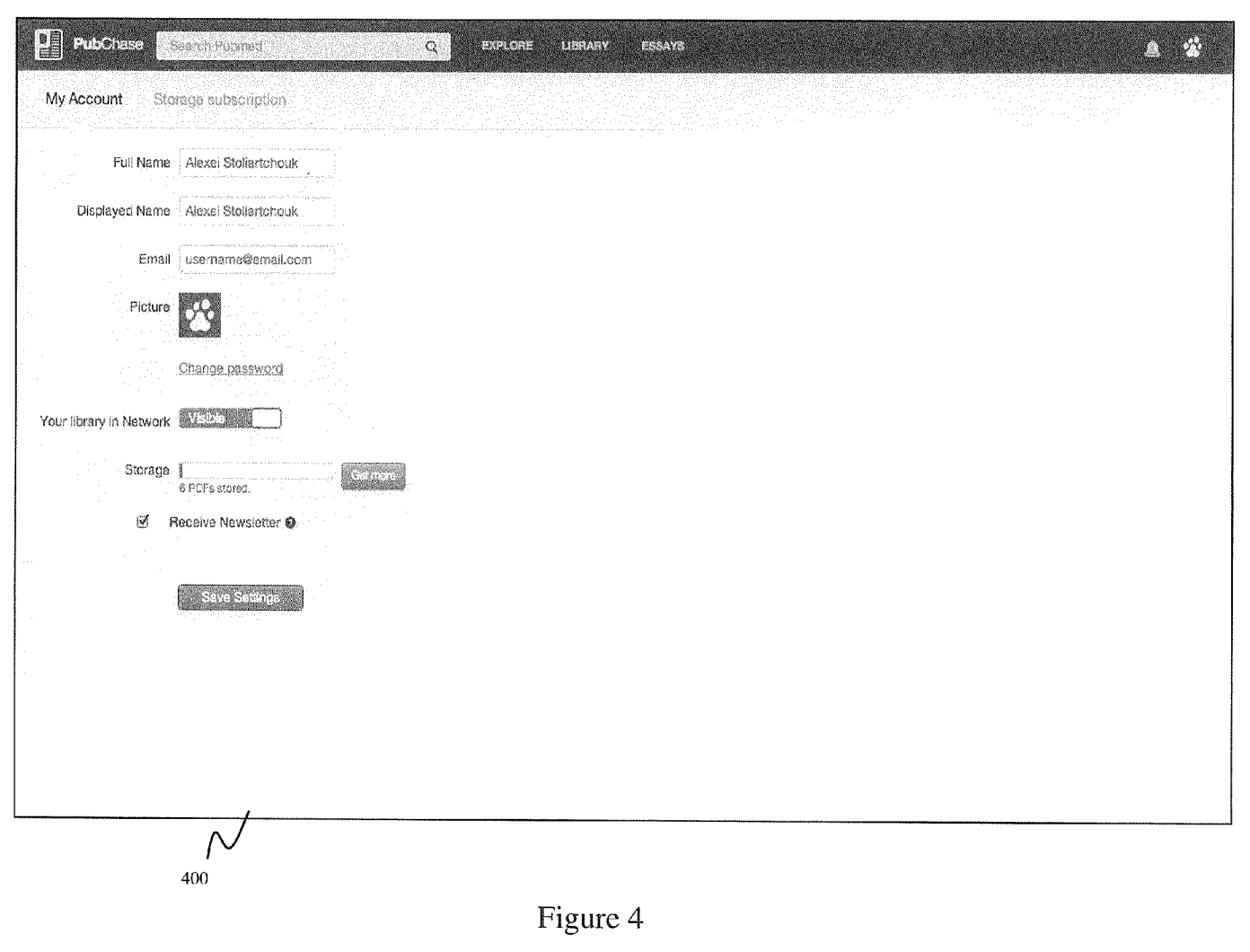

As shown in FIG. 4, the library management application [113] may include an account functionality [114] for displaying an account screen [400]. Through the account screen [400], the user may input account information such as an email account, privacy settings (e.g., the visibility of the user's library to other users), identity criteria (e.g., a display name that may be visible to other users), etc.

The account functionality [114] may include a user interest functionality [117], which may contain fields (not shown) for receiving user input specifying interest criteria. For example, a user may indicate that he or she is interested in obtaining research publications relating to particular scientific disciplines, written by particular authors, relating to particular research collaborations, conducted in particular laboratories, relating to particular topics, etc. The fields may include any type of fields including drop-down menus, check-boxes wherein a user may cause a box to be checked to indicate a particular interest, or text fields allowing a user to type content into a field to indicate a particular interest. The user interest functionality [117] may include any number of interests, and the interests may belong to any number of categories. For example, interest categories may include scientific discipline, author, research collaboration, research laboratory, professor, research topic, etc.

Referring back to FIG. 1, the library management application [113] may include a search functionality [118] that communicates with the search part [136] of the research publication management apparatus [104] for retrieving research publications from the research publication database

[105]. In the embodiment shown in FIG. 2, the search functionality [118] is included on the home screen [200]. Through the search functionality [118], the application [113] may provide the user with at least one search field [203] for specifying search criteria. While the field [203] may include any type of field (e.g., drop-down menus, check-box fields, etc.), the embodiment depicted in FIG. 2 comprises fields [203] for receiving typed user input. As shown in FIG. 2, the search functionality [118] may provide a field for searching all contents and features of the research publications in the research publication database [105]. In some embodiments, the search functionality [118] may include a field for searching for a particular author, a particular disciplinary area, a particular laboratory, a particular research collaboration, a particular professor, etc. Upon a user entering search criteria into one or more fields [203], the user may activate this feature, for example, by a "search" button [204]. Activation of the "search" button [204], for example, may initiate the library management apparatus [104] to conduct a search of the research publication database [105] based upon the inputted search criteria. In turn, the library management apparatus [104] may retrieve research publications in response to the search criteria from the research publication database [105] for presentation to the display unit [110] of the terminal [101].

Figure 5:
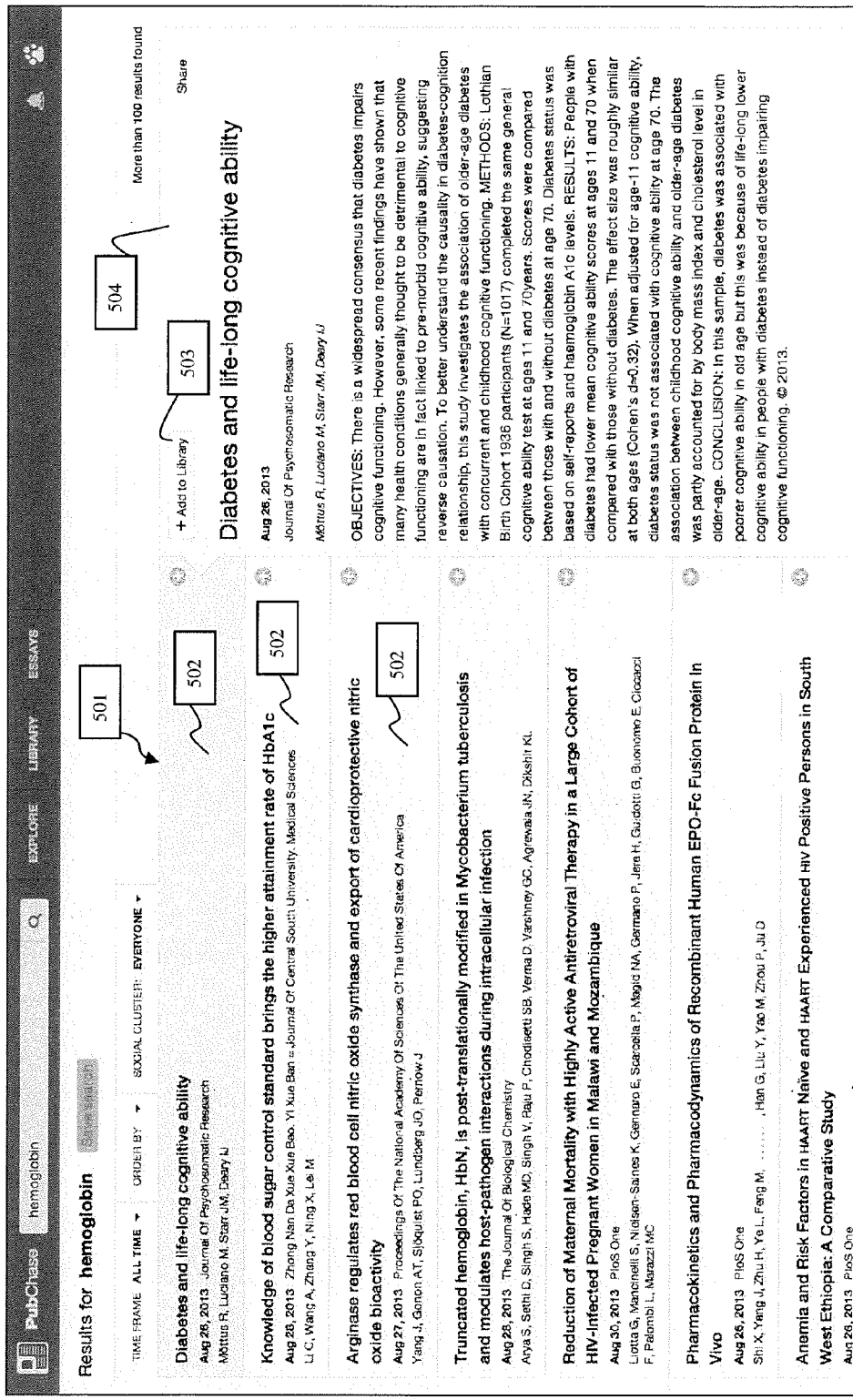
FIG. 5 shows a sample screenshot of a search results screen, according to one embodiment of the disclosure.

As shown in FIG. 5, the application [113] may include a search results configuration functionality [119] for presenting one or more search results [502] to a user via a search results screen [500]. The search results configuration functionality [119], together with a search results configuration part [137] of the library management apparatus [104], may control the presentation of the search results [502] to the user. For example, the search results configuration functionality [119] and the search results configuration part [137] may configure the search results [402] so that they are displayed sequentially, as a list [501], to the user based on relevance. The search results configuration functionality [119] and the search results configuration part [137] may determine the relevancy of the search results based on the user's interest criteria, the contents stored in the user's library, and/or the contents stored in the user's community libraries.

The displayed sequence of the search results may be determined based on features associated with the retrieved research publications. For example, the research publications in a user's library may each be associated with a plurality of features. Features may be defined as associative information related to the research publications. Features include one or more authors, one or more laboratories, one or more professors, one or more laboratory protocols, one or more topics that is related to the research (e.g., a molecule), one or more research collaborations, one or more disciplines, one or more research projects, etc. relating to a particular research publication.

The search results configuration functionality [119] may communicate with a my library functionality [123] to enable the user to save a list of research publication citations and/or copies of research publications to a library. For example, this feature could be activated by a user through an "add to library" button [503] when presenting each retrieved research publication in a presentation section [504] of the search results screen [500]. The library management functionality [121] may include a "my library" functionality [123], which may communicate with a store functionality [120] through activation of the "add to library" button [503]. For example, when a user activates an "add to library" button [503] associated with a particular research publication, the store functionality [120] will work with the "my library" functionality [123] to cause the terminal processor [111] to store a copy of the particular research publication citation in the user's library.

Figure 6:
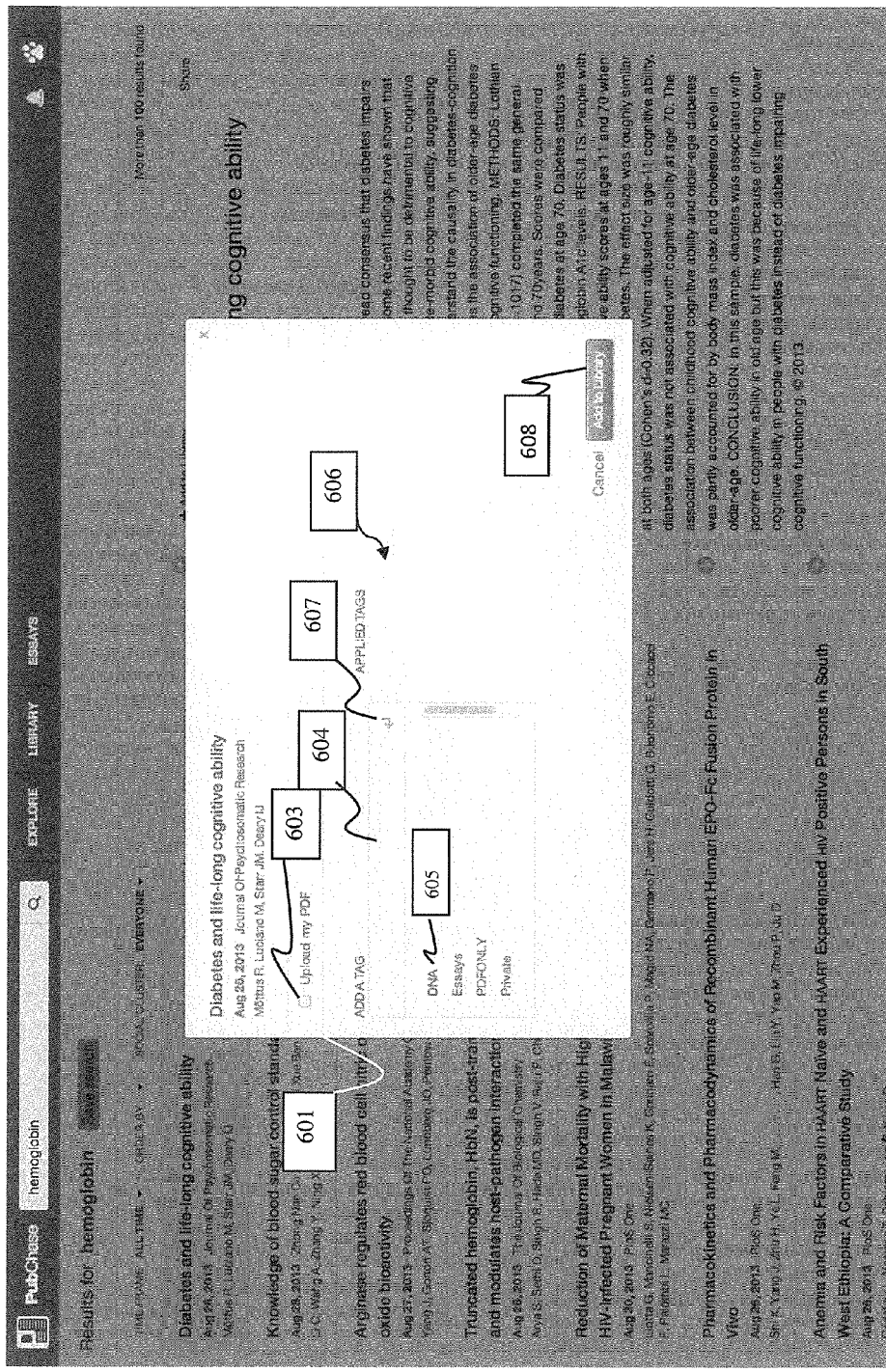
FIG. 6 shows a sample screenshot of a save screen, according to one embodiment of the disclosure.

Now turning to FIG. 6, shown is a store screen [600] for storing content in a user's library through the store functionality [120]. In some embodiments, as shown in FIG. 6, when saving a copy of the research publication citation to the user's library, the store screen [600] will provide the user with an opportunity to add other content (e.g., a PDF) along with the research publication citation. For example, FIG. 6 shows a store window [601] presented to the user upon activation of the "add to library" button [503].

The store window [601] may allow the user to upload other content for storing in the user's library together with the research publication. For example, FIG. 6 depicts an "upload my PDF" button [603], activation of which may allow the user to upload a PDF document and save the PDF document together with the research publication in the user's library in an associative relationship. Thus, the user may gather other content from various research sources and save the other content (e.g., PDF files) in the library together with the related research publication. For example, the user may save a photo-copy of a page from a book as a PDF document and save the PDF document with the related research publication. As another example, the user may scan and upload hand-written notes as a PDF document and save the PDF of the hand-written notes together with the research publication. As such, the application enables a user to pull various types of research materials from multiple sources and keep the materials together within a single, manageable library.

In some embodiments, when saving a research publication to the user's library, the store functionality [120] will provide the user with an opportunity to associate one or more data-tags with the research publication. The one or more data-tags may be used by the application [113] and/or by the library management apparatus [104] in implementing searching, managing, and/or recommending functionalities, the details of which are explained below.

For example, as shown in FIG. 6, the store window [601] may allow the user to add tags to be associated with the stored research publication in the user's library. An "add tag" input field [604] may allow a user to create a new tag by inputting (e.g., typing) a tag name into the field [604]. The user may activate an "add tag" button [607] to thereby associate the content entered into the input field [604] as a "tag" for the research publication. The store window [601] may also present a list [605] of tags previously used by the user. Thus, the user may highlight one of the listed tags (e.g., by clicking on the one of the listed tags) and activate the "add tag" button [607] to thereby associate the highlighted tag name as a "tag" for the research publication. The store window [601] may include a portion [606] for displaying a list [606] of the "tags" selected by the user that will be associated with the research publication upon activation of the "add to library" button [608]. Before activating the "add to library" button, the user may be provided an opportunity to unselect one or more of the listed tags. Upon a user activating the "add to library" button [608], the research publication and the selected list of tags will be saved in an associative relationship to the user's library.

Figure 7:
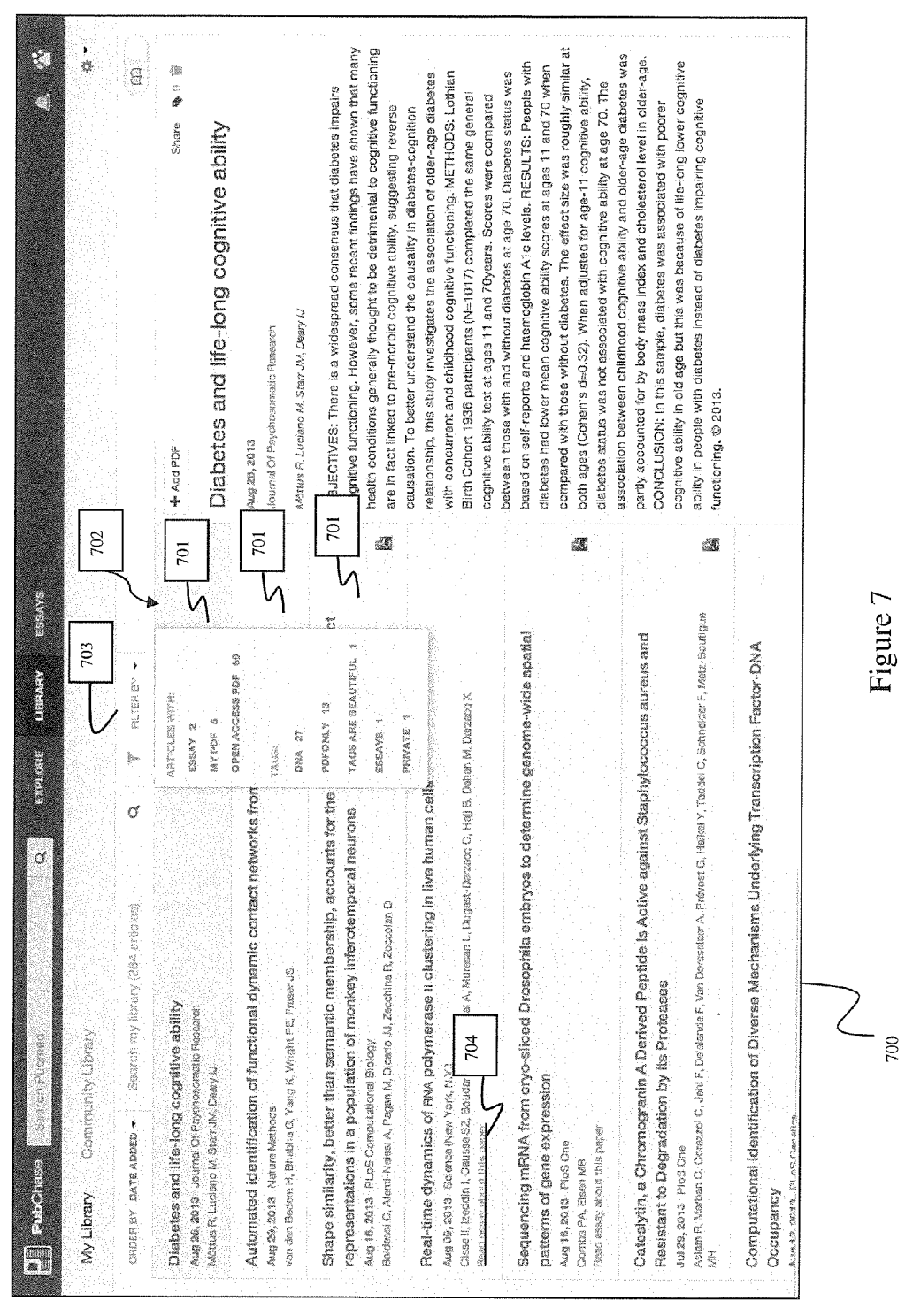

Now turning to FIG. 7, upon a user saving a research publication through the store functionality [120], a library management functionality [121] may store saved research publications in the user's library. FIG. 7 depicts a user library screen for presenting the research publication citations [701] saved by the user. The "My Library" screen may present a list [702] of the research publications according to any user-specified order (e.g., based on the dates the research publications were published, based on the dates the research publications were saved to the user's library, etc.). The library management functionality [121] may include a filter functionality [122] to control the presentation of the library contents to the user library screen [700]. For example, a filter button [703] may enable the user to filter a list [702] of library contents based on various criteria. In the embodiment shown in FIG. 7, the filter button [703] allows a user to select which data-tags are to control which research publication citations [701] are included in the list [702]. For example, upon a user selecting the "DNA" tag, only library contents that include a "DNA" tag will be displayed on the user library screen [700].

Figure 8A:
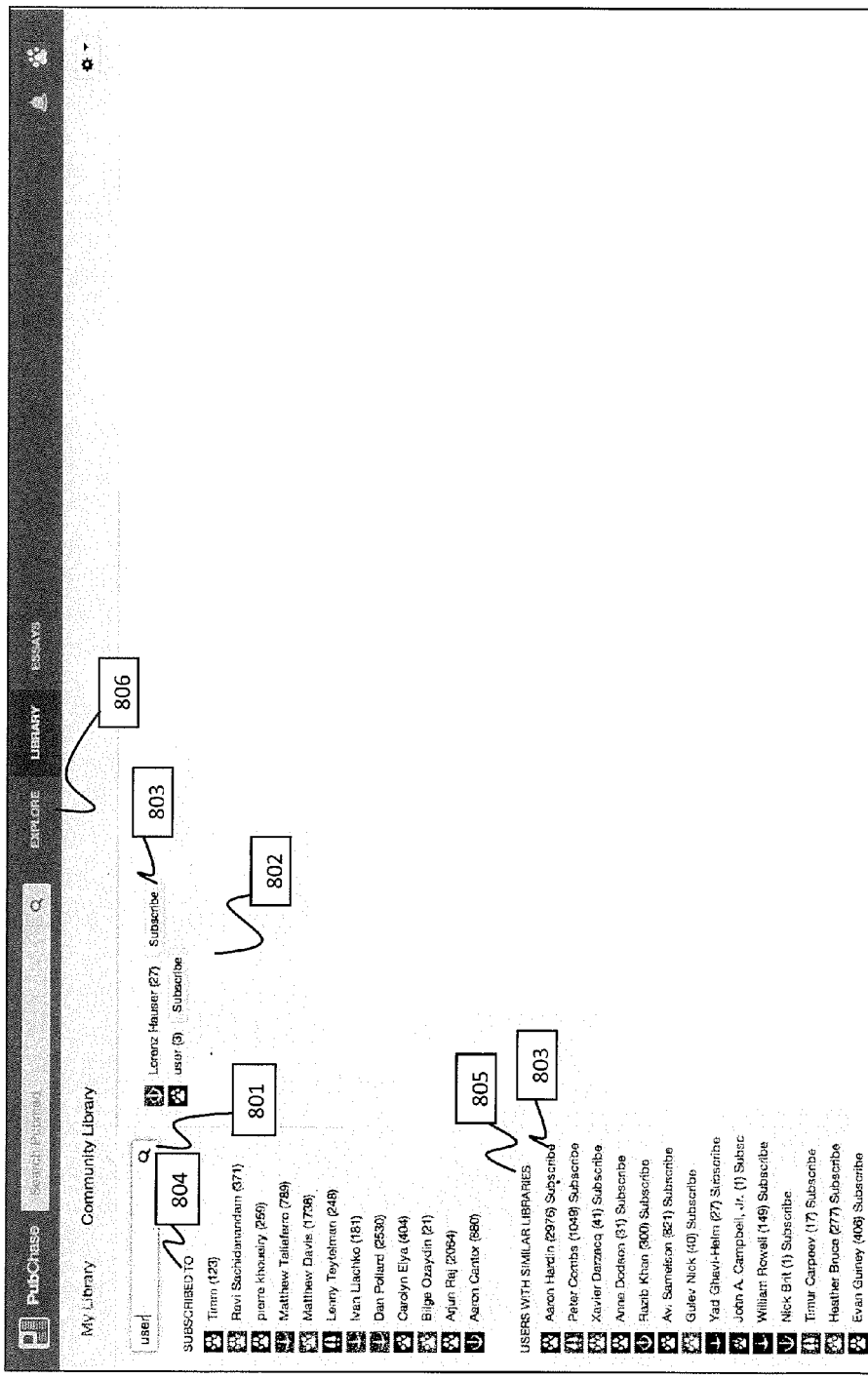
Figure 8B:
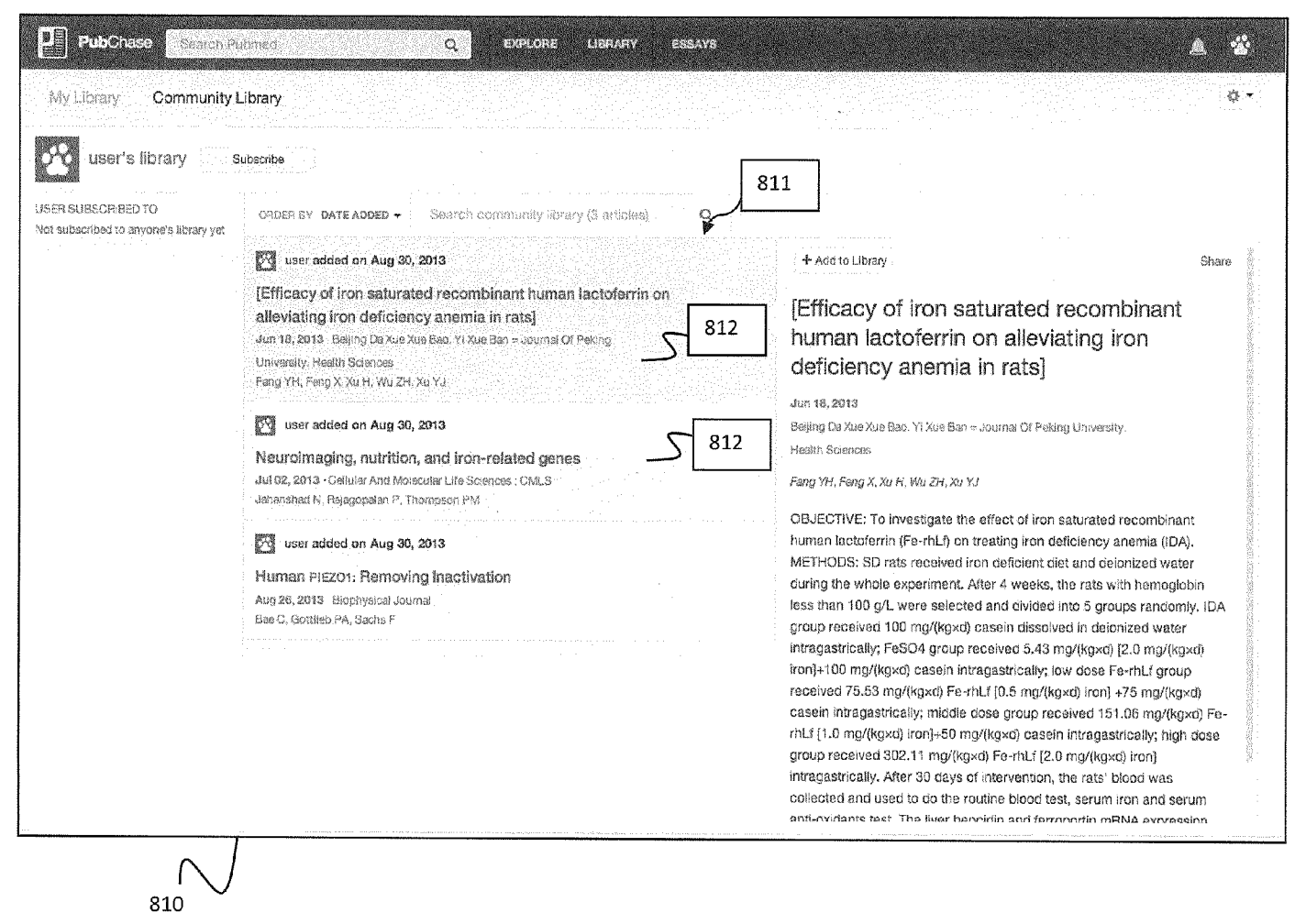

Now turning to FIGS. 8a and 8b, the library management functionality [121] may include a community library functionality [124]. The community library functionality [124] may communicate with the community part [139] of the library management apparatus [104] to serve as a social networking platform by providing communication and interconnectedness among multiple users' libraries. The application's community library functionality [124] may display a community screen [800] providing a user with a field [801] for entering input requesting to "follow" another user. The community part [139] of the library management apparatus [104] may receive the input, search for the other user based on associating the user's input with other users' account information (e.g., entered by other users via the account screen [400]), and display a retrieved list of other users [802] in a portion of the community library screen [800]. A "subscribe" button [803] may be presented next to each other user's name in the list [802] of other users. Thus, the user may activate a "subscribe" button [803] next to the name of each other user whom the user wishes to follow. Upon the user activating the "subscribe" button [803] next to a particular other user's name, the application's community library functionality [124] works with a community part [139] of the library management application [104] to establish a link between the user and the particular other user.

As shown in FIG. 8a, the community screen [800] may display to the user a list [804] of the other users the user is following. Also shown in FIG. 8a, the community screen [800] may display to the user a list [805] of recommended users whom the library management apparatus' [104] community part [139] recommends the user to follow.

In some embodiments, the community part [139] may determine the recommended users based on the contents of the user's library and/or the user's searches and based on contents of the other users' libraries and/or the other users' searches (e.g., based on determining other users with libraries similar to the user's library, and/or determining other users with search histories similar to the user's search history).

In some embodiments, the community part [139] may determine the recommended users based on various features. Features, may include one or more authors, one or more laboratories, one or more professors, one or more laboratory protocols, one or more topics that is related to the research (e.g., a molecule), one or more research collaborations, one or more disciplines, one or more research projects, etc. Thus, the community part may recommend other users based on matching or relating the features associated with the research publications in the user's library to the features associated with research publications in other users' libraries. For example, in recommending other users, the community part may determine that a predetermined amount of features in the user's library match, correspond to, and/or are associated with the features in other users' libraries. According to an embodiment, the community part [139] may base the determination on data-tags associated with the features in the user's library and data-tags associated with the features in the other users' libraries. In an embodiment, the community part [139] may determine recommended users based on user interest information.

Upon the community part [139] determining one or more other users to recommend, the community part [139] may communicate the recommendations to the community library functionality [124] of the library management application [113]. The application [113] may then display a list [805] of names of the recommended users on the community library screen [800]. A "subscribe" button [803] may be presented next to each recommended user's name in the list [805]. Thus, the user may activate a "subscribe" button [803] next to the name of each recommended user whom the user wishes to follow. Upon the user activating the "subscribe" button [803] next to a particular recommended user's name, the application's community library functionality [124] works with a community part [139] of the library management application [104] to establish a link between the user and the particular recommended user. As such, the user will "follow" the particular recommended user, and the particular recommended user's name will appear in the list [804] of users whom the user is following.

Now turning to FIG. 8b, upon links being established between the user and other users, a community library screen [810] may present to the user a list [811] of research publications [812] stored in each of the other users' libraries. The community part [139] of the library management apparatus [104] may monitor the contents of the other users' libraries and communicate the contents to the community library functionality [124] of the application [113]. As such, as shown in FIG. 8b, the community library screen [810] may present to the user the list [811] of research publications [812] stored in the other users' libraries. The user may save copies of the other users' research publication citations [812] to his or her own library. In some embodiments, the user's library may associate other content (e.g., a PDF document uploaded by the other user) together with the research publication. Thus, the user may save copies of the other user's PDF document along with the research publication to his or her own library. In other embodiments, each specific user's content remains private to the specific user, and thus the user may not be allowed to retrieve PDF documents and/or other content from other users' libraries. The user may also associate one or more tags with the research publications. The storing of the research publications, tags and other content from a user's community library to the user's library may be similar to that described supra with reference to FIGS. 5 and 6.

Figure 9:
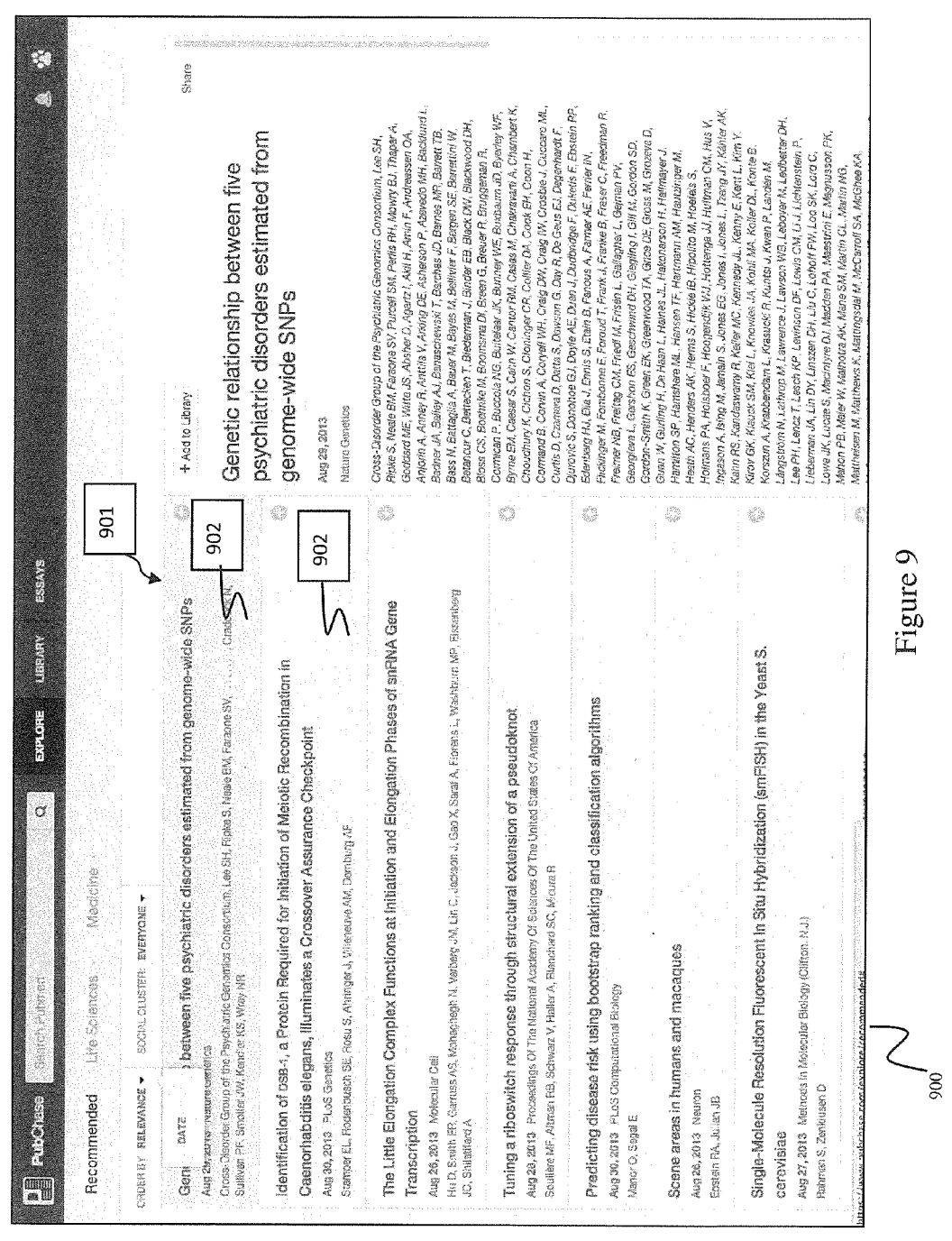

Now turning to FIG. 9, the library management application [113] may comprise a recommendation functionality [125] for displaying a recommendation screen [900] providing a list [901] of recommended research publications [902] to the user. The application's recommendation functionality [125] may receive recommendations from the recommendation part [140] of the library management apparatus [104]. The recommendation functionality [125] may cause the terminal processor [111] to transmit a request to the management processor [129] to search the research publication database [105] based on various criteria such as content in the user's library, and/or content in the user's community library, and/or the user's search history and/or search histories of other users in the user's community and/or the user's interest criteria, and/or interest criteria associated with other users in the user's community. Upon a recommendation part [140] of the management processor [129] receiving the request including the search criteria, the search part [136] of the management processor [129] may search the research publication database [105] based on the search criteria. Thus, the search part [136] may retrieve recommended research publications [902] based on the search criteria and transmit the recommended research publications [902] to the terminal processor [111]. According to an embodiment, a list [901] of the recommended research publications [902] may be available for display to the viewer upon the user activating the recommend button [202] on the home screen [200], as illustrated in FIG. 2, and/or may be emailed periodically to a user, and/or may be displayed through other screens (e.g., via an "explore" button [806] on the community screen, as shown in FIG. 8a).

In some embodiments, the recommendation part may recommend to a user a research publication based on determining that other users have the research publication stored in their libraries and that the other users have libraries similar to that of the user. Thus, the recommended part may inform the user of research publications that are most likely being read by many other users in the user's similar field of research or expertise. In doing so, the recommendation part may determine that the other users have libraries containing research publications with features that match or are similar to the features associated with research publications stored in the user's library. Thus, the recommendation part determines a relevant group of other users. As such, the recommendation part may determine that a large amount of the relevant group have a particular research publication stored in their libraries but that the user does not have the research publication stored in his or her library. Thus, the recommendation part may recommend the particular research publication to the user.

In some embodiments, the application [113] may comprise a data feed functionality [126] for working with the recommendation functionality [125] and the recommendation part [140] to providing a user with up to date recommendations of research publications. For example, the recommendation part [140] may comprise a data feed part [145] configured to scan the research publication database [105] for newly added research publications. The data feed part [145] may scan the research publication database [105] on a substantially continuous basis after the lapse of a predetermined amount of time (e.g., after the lapse of a predetermined number of seconds, minutes, hours, days, etc.). In some embodiments, a user may control how often the searches are conducted by indicating the amount of time to lapse between searches. In some embodiments, the data feed part [145] may scan the database [105] for any new publications that have become available since a previous scan. In some embodiments, the scan may be based on authors and journals associated with the research publication citations [701] stored in the user's library and/or the user's interest criteria and/or based on content (research publications and/or secondary content) stored in the user's library. For example, in some embodiments, the data feed part [145] may initiate periodic searches of the database [105] for newly added publications containing data-tags that match, correspond to, and/or are associated with the data-tags assigned to the research publication citations [701] stored in the user's library. Additionally or alternatively, the periodic searches may be for newly added publications containing data-tags that match, correspond to, and/or are associated with the user search criteria input. As such, the recommendation user functionality [125] may provide the user with an up to date list of publications specifically tailored to the user's interests and relevant to the user's existing library.

Figure 10:
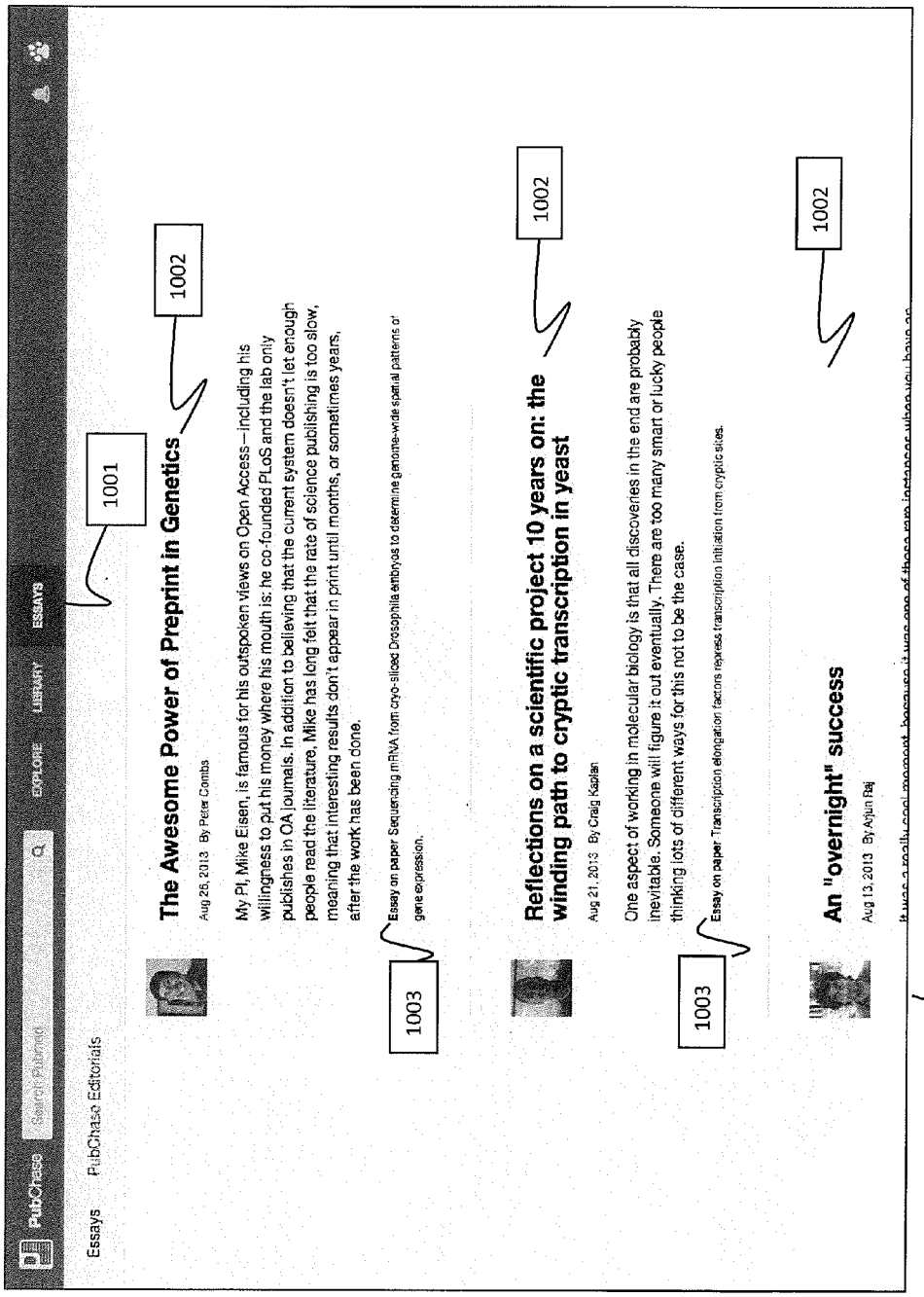
FIG. 10 shows a sample screenshot of an author essay screen, according to one embodiment of the disclosure.

Now turning to FIG. 10, in an aspect of the present disclosure, an author essay screen [1000] may support an author essay functionality [127] that allows one or more users and/or one or more authors of a research publication to contribute original content about one or more research publications. This original content is associated with specific research publication so that a user interested in the research publication can also obtain information related thereto, which may be of interest. In this way, the present disclosure provides a venue for sharing the "backstage" stories about the research articles. For example, the "backstage" story may comprise an author's account of the journey to publication and the personal drama relating thereto, for example, why it took several years to publish a paper, whether the discovery was accidental, whether the experiment was daring and risky, why the publication is special to the author, etc.

In order to preserve the integrity of this feature, the library management apparatus [104] may limit the authoring of the essays to the authors of the underlying research publication. For example, when submitting an author essay to the database, the author may be required to input information verifying that he or she is indeed an author of the underlying research publication. As another example, the library management apparatus [104], may send out invitations allowing one or more users and/or one or more authors to provide one or more author essays. If the one or more users and/or one or more authors accept the invitation, the system will allow the one or more users and/or one or more authors to upload the author essay, and will associate the author essay with the underlying research publication. As such, every time the research publication is shown as a search result, a user, likely already interested in the work, is encouraged to read more about the research project on a personalized level.

According to an embodiment, the one or more users and/or one or more authors can promote an author essay by posting a link to the essay on any social media website, such as, for example, Facebook, Twitter, Google+, and/or emailing the link to friends and colleagues.

As shown in FIGS. 2 through 10, an "essays" button [1001] may be included in a header portion one or more screens [200]-[1000]. Upon a user activating the "essays" button [1001], the author essay functionality [127] may present to the terminal an author essays screen [1002] for displaying author essays. For example, the author essays may comprise literature written by a researcher and may include a personal account of the researcher's endeavors during the research project. The literature may relate to personal aspects of the research project such as personal struggles and/or events the author experienced during the research, unexpected findings or results following from the research, experiences with lab equipment and protocols, endeavors with other scientists, corrections and additions to the published material, etc.

As shown in FIG. 10, an author essay screen [1000] may display the author essay [1002] with a link [1003] to a research publication written by or otherwise associated with the author of the author essay [1001]. Author essays may also be accessible from a research publication interface. For example, referring back to FIG. 7, in displaying a particular research publication [701] via the user library screen [700], the application [113] may present a link [704] to an essay written by the author of the research publication.

According to an embodiment, a moderation functionality [128] is provided that allows one or more users and/or one or more authors to moderate and respond to comments and questions regarding research publications and/or author essays and/or posts. For example, the terminal processor [111] may present through the author essay screen [1001] an author essay [1002] together with comments and discussion associated with the author essay. In other embodiments, the author essay screen [1000] may include a link to direct a user to a blog-like interface displaying comments and discussion associated with the author essay.

Through the moderation functionality [128], the one or more users and/or one or more authors of the author essay may moderate the discussion so to respond to comments and questions regarding the essay. For example, a user may, through the moderation interface, ask the one or more users and/or one or more authors about his or endeavors throughout the research project and/or may ask technical question relating to the research itself. The one or more users and/or one or more authors may thereby converse with the users and send messages answering such questions and/or provide any other input. Thus, the library management application [113] provides a means for users and/or authors to converse with other users on a personalized level.

The moderation functionality [128] may provide the author of the author essay to have control over the user-contributed comments and questions that are linked to the author essay. For example, before a user-contributed comment or question is displayed with the author essay, the one or more users and/or one or more authors may need to approve the comment or question directly from the interface or via e-mail.

The moderation functionality [128] may comprise a takedown functionality allowing one or more users and/or one or more authors to remove content from the interface (e.g., content that may raise copyright concerns, etc.). The moderation functionality [128] may comprise a "flag as inappropriate" tool to allow the one or more users and/or one or more authors or other users to flag material on the interface as inappropriate. The one or more users and/or one or more authors may moderate the "flag as inappropriate" tool (e.g., by taking down the flagged material if the one or more users and/or one or more authors deem the flagged material to be inappropriate or by removing the flag from the material if the one or more users and/or one or more authors deem that the flagged material is not inappropriate).

While above describes a blog-like interface accessible through an author essay screen [1001], the blog-like interface may be also accessible through a user library screen [700]. For example, as a research publication is presented to a user, a discussion button (not shown) may be presented together with the research publication for directing a user to a discussion platform associated with the research publication. Thus, readers may send messages containing questions (e.g., from a first terminal) for the research participants and the research participants may send messages containing answers (e.g., from a second terminal). In some embodiments, a research publication or author essay may comprise a plurality of links directing users to different article-associate author content. For example, a first link may lead to information relating to lab protocols, a second link may lead to information relating to the theoretical aspects of the research, and a third link may lead to information relating to the analysis of the experimental data. A blog-like screen may display the blog with a link to one or more research publications and/or essays associated with the blog.

In addition to enabling communications between users and/or authors via the moderation functionality [128], in one embodiment the library management application [113] may enable communication between users via an advisory functionality [147] for providing a crowd-sourced virtual mentor for scientists. The advisory functionality [147] may be any functionality known to those skilled in the art that may enable virtual discussions between users. The virtual discussions may occur via any means known to those skilled in the art, including, but not limited to, email, instant messaging, and/or video chatting.

Figure 16:
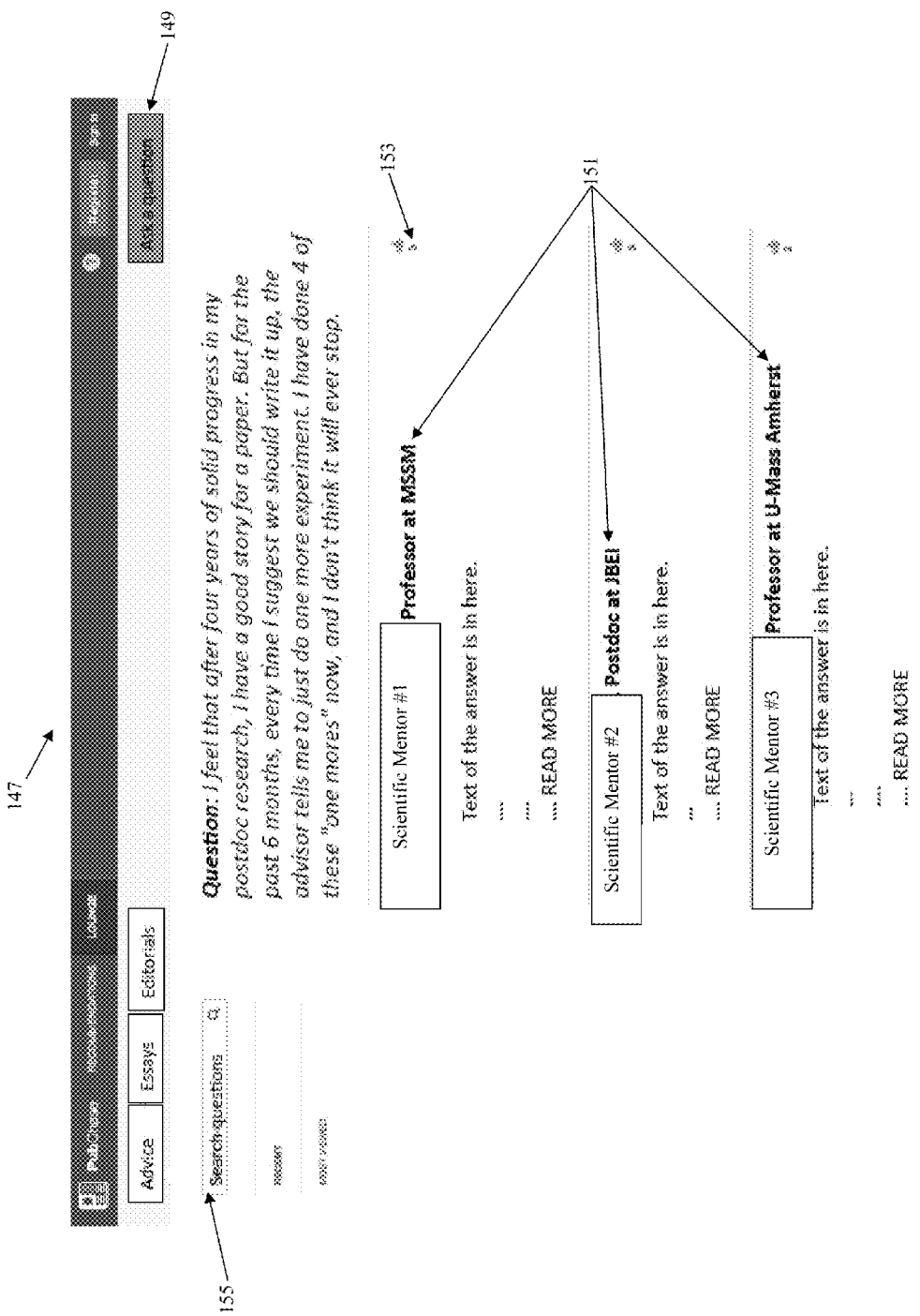
FIG. 16 shows a sample screenshot of an advisory screen, according to one embodiment of the disclosure.

In one embodiment, as illustrated in FIG. 16, the advisory functionality [147] may enable virtual discussions via, for example, a paragraph-level discussion of scientific questions and answers. For example, the advisory functionality [147] may enable any user signed into the library management application [113] to post a question and/or an answer about any desired scientific topic. The advisory functionality [147] may provide users with the option of posting the questions and/or answers anonymously or with an identifying username.

Users signed into the library management application [113] may post the questions and/or answers using a commenting tool [149]. The commenting tool [149] may be any tool known to those skilled in the art configured to enable expression of a user's remarks. For example, as illustrated in FIG. 16, the commenting tool [149] may be a box (or any desired shape known to those skilled in the art), that when selected by the user, enables typographical and/or graphical formations.

Library management application [113] users may use the commenting tool [149] to start a new discussion or respond to a previously-existing discussion. For example, if a user has a question that has not yet been asked, the user may start a discussion by posting the question so that other users may respond. Alternatively, a user may respond with an answer to a previously-asked question. As illustrated in FIG. 16, the advisory functionality [147] may enable any comment in response to an existing question to be posted below the question, which may enable the, for example, paragraph-level discussion.

As previously discussed, the advisory functionality [147] may be configured to enable any user signed into the library management application [113] to submit either a question or an answer to a previously-submitted question. In alternative embodiments, as illustrated in FIG. 16, the advisory functionality [147] may be configured such that users may only submit questions. The questions may be posted automatically for viewing by the users. Alternatively, the questions may be stored in an advisory part [146] of the library management apparatus [104] and may be accessible to a select group of people. For example, in one embodiment, the questions may be accessible to a library management moderator(s) who may be responsible for reading the questions and determining which questions may be posted in the library management application [113].

In addition, or alternatively, any or all of questions may be accessible to a group of designated scientific advisors or mentors who may be responsible for providing answers to the questions. The designated scientific advisors or mentors may be at least one of the one or more of the library management application [113] users identified by the library management moderator(s) as desired people for answering the submitted questions. The library management moderator (s) may designate each scientific advisor or mentor based on any qualifications and/or characteristics known to those skilled in the art that may be considered desirable qualities for a scientific advisor or mentor. For example, the scientific advisors or mentors may be designated based on characteristics including, but not limited to, scientific knowledge, education level (e.g., masters, PhD, post-doc), teaching experience (e.g., teaching assistant, professor, tenured professor), and/or research experience (e.g., student, industry scientist).

Upon designation, the library management moderator(s) may provide an identifying label [151] for each scientific advisor or mentor, including, but not limited to, professor, post-doc, student, and/or industry scientist. The library management moderator(s) may designate any desired number of scientific advisors or mentors. In one embodiment, for example, 25-30 scientific advisors or mentors may be designated.

The advisory functionality [147] may be configured such that the names and/or label [151] of the designated scientific advisors or mentors may be available to library management application users. For example, in one embodiment, users may be able to view each scientific advisor or mentor's name and/or label [151]. In addition, or alternatively, the users may be able to view a profile accompanying each scientific advisor or mentor. The profile may include any information known to those skilled in the art that may describe the scientific advisor or mentor's scientific knowledge and experience.

In one embodiment, the advisory functionality [147] may be configured such that after a question is posted, for example, either directly by a library management application user or by the library management moderator(s), any of the designated scientific advisors or mentors may use the commenting tool [149] to post an answer to the question. Alternatively, the advisory functionality [147] may be configured such that the library management moderator(s) may select which scientific advisors or mentors may respond to each question.

In a further embodiment, the advisory functionality [147] may be configured such that users may submit their questions (either with an identifying name or anonymously) directly to one or more of the designated scientific advisors or mentors. The users may select which scientific advisors or mentors to submit their questions to, based on the information that may be available in the library management application [113] regarding each of the scientific advisor's or mentor's knowledge and experience.

Like the submitted questions, answers from the designated scientific advisors or mentors may be accessible for viewing automatically upon submission or may be stored in the advisory part [146] and accessible to the library management moderator(s) prior to posting in the library management application [113]. For example, in some embodiments, the library management moderator(s) may review each answer and select a desired number of answers for posting under each question.

The advisory functionality [147] may enable library management application [113] users to provide feedback regarding the answers that are posted. In some embodiments, the user feedback may be in the form of a feedback comment and/or ranking. Alternatively, or in addition, FIG. 16 illustrates that feedback may be in the form of a quality score [153] of the answer. As illustrated in FIG. 16, the quality score [153] may be a single number on a scale (e.g., 1-5, 1-10, etc.) chosen by a user based on the user's overall opinion of the answer. Alternatively, or in addition, the user's overall opinion of the answer may be represented by a selected number of characters (e.g., a star, asterisk, or any other desired character known to those skilled in the art). In further embodiments, the quality score may be a display of multiple numbers (or characters) on a scale, with each number (or character) corresponding to a characteristic of the answer (e.g., clarity, correctness, overall usefulness of the answer, etc.).

The management processor [129] may be configured to compile and calculate the overall quality score(s) for each answer so that the answers to questions may be displayed in the, for example, paragraph-level discussion in descending quality score order, with the answers having the highest quality score at the top (i.e., displayed closest to the question). The management processor [129] may be configured to calculate the overall quality score(s) via any means known to those skilled in the art. For example, in one embodiment, the management processor [129] may be configured to calculate the overall quality score(s) based on an average of all quality scores submitted for each answer.

As previously discussed, the questions and answers that are submitted via the library management application [113] may be stored in the advisory part [146] of the library management apparatus [104]. The advisory part [146] may be a searchable database. For example, in one embodiment the advisory part [146] may be configured to communicate with the advisory functionality [147] such that library management application [113] users may be able to search questions and answers stored in the database via a search function [155]. Users may be able to search the questions and answers based on a variety of characteristics, including but not limited to, topic, keywords, and username of the question and/or answer submitter.

The advisory part [146] may further be configured to notify library management application [113] users upon receipt of a question and/or answer containing specified characteristics. For example, a feature may provide a notification to a user who posts a question every time an answer to that question is posted. Alternatively, or in addition, the advisory functionality [147] may enable a user to select a question (or questions) for which they want to be notified when responsive answers are posted. Moreover, in some embodiments, the advisory functionality [147] may include an option for users to select the characteristics for which they would like to be notified if included in a question and/or answer. The characteristics may include, but are not limited to, topic, keywords, and username of the question and/or answer submitter.

User notifications may be any desired notification known to those skilled in the art, including, but not limited to, mobile and/or tablet alerts, text messages, and messages to the user when the user signs into the library management application [113]. Alternatively, or in addition, in some embodiments, the user notifications may be in the form of an automatically generated email. The library management application [113] may be configured such that users may select how often they would like to receive notifications (e.g., instantaneously, daily, weekly, etc.). In addition, users may be able to customize the timing of notifications based on selected topics and/or questions.

In some embodiments, the library management apparatus [104] may further be configured to provide user notifications when new information may be available in connection with papers that may be stored in a library management application [113] user's library. For example, in some embodiments, user notifications may be configured to be provided when a paper in the library management application [113] user's library may be retracted. Alternatively, or in addition, in some embodiments, user notifications may be configured to be provided when a paper in the library management applicant [113] user's library may be revised and/or corrected by the author. In addition, or alternatively, in some embodiments, user notifications may be configured to be provided when a paper in the library management application [113] user's library may be part of a discussion online, at a conference, in another paper, and/or in any other forum known to those skilled in the art.

Figure 11:
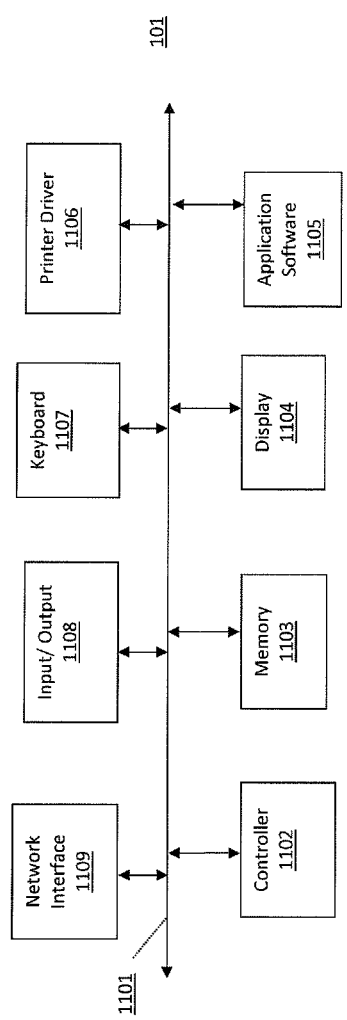
FIG. 11 shows a block diagram of a terminal, according to one embodiment of the disclosure.

Now referring to FIG. 11, an exemplary constitution of the terminal [101] of FIG. 1 (for example, as a computer) is described. In FIG. 11, terminal [101] includes a controller [1102] (or central processing unit) that communicates with a number of other components, including memory [1103], display [1104], keyboard (and/or keypad) [1107], other input/output [1108] (such as mouse, touchpad, stylus, microphone and/or speaker with voice/speech interface and/or recognition software, etc.), network interface [1109], print driver [1106] and application software [1105], by way of an internal bus.

The memory [1103] can provide storage from program and data, and may include a combination of assorted conventional storage devices such as buffers, registers and memories [for example, read only memory (ROM), programmable ROM (PROM), erasable PROM (EPROM), electronically erasable PROM (EEPROM), static random access memory (SRAM), dynamic random access memory (DRAM), non-volatile random access memory (NOVRAM), etc.].

The network interface [1109] provides a connection (for example, by way of an Ethernet connection or other network connection which supports any desired network protocol such as, but not limited to TCP/IP, IPX, IPX/SPX, or NetBEUI) to the network to which the computer is connected (e.g. network of FIG. 1).

The print driver [1106] and application software [1105] are shown as components connected to the internal bus, but in practice are typically stored in storage media such as a hard disk or portable media, and/or received through the network, and loaded into memory as the need arises.

Depending on the type of the particular terminal device, one or more of the components shown in FIG. 11 may be missing. For example, a particular terminal may be missing the print driver [1106] and the keyboard [1107].

Additional aspects or components of the computer are conventional (unless otherwise discussed herein), and in the interest of clarity and brevity are not discussed in detail herein. Such aspects and components are discussed, for example, in "How Computers Work", by Ron White (Que Corporation 1999), and "Now Networks Work", by Frank J. Derfler, Jr. and Les Freed (Que Corporation 2000), the entire contents of each of which are incorporated herein by reference.

Figure 12:
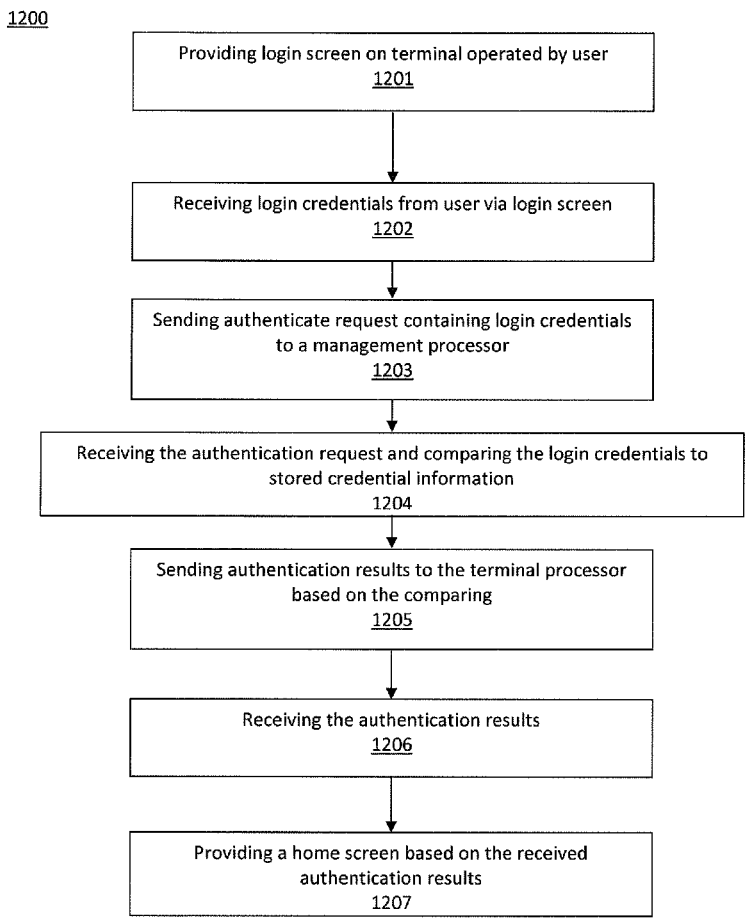
FIG. 12 shows a work flow of a method for authenticating a user, according to one embodiment of the disclosure.

With reference to FIG. 12, a work flow of a method for authenticating a user [1200], according to one exemplary embodiment is described.

Step 2101 comprises providing a login screen on a terminal operated by a user. When the management processor [129] receives a request to display a login screen [300] from the terminal [101], the management processor [129] transmits the requested login screen [300] to the terminal [101], and the transmitted login screen [300] is displayed to the user via the terminal display unit [110]. Step 1202 comprises receiving credentials from a user via the login screen. When the user at the client terminal [101] submits his or her login credentials via the login screen [300], the terminal processor [111] receives the user login credentials. Step 1203 comprises sending an authentication request and comparing login credientials to stored credential information. Thus, upon the terminal processor [111] receiving the user login credentials, the terminal processor [111] uses the received login credentials in sending a request to the management processor [129] for authenticating the user. The management processor [129] may authenticate the user using DMAPI web services (e.g. as a regular user of the library management system). Step 1205 comprises sending authentication results to the terminal processor based on the comparing, and step 1204 comprises receiving the authentication results. In some embodiments, the management processor [129] returns to the terminal processor [111] the authentication results. Step 1207 comprises providing a home screen based on the received authentication results. Thus, in some embodiments, the terminal processor [111] transmits to the client terminal display unit [110] a screen based on the received authentication results. For example, if the user is authenticated as an administrative user, the screen displayed to the screen includes administrative functions, such as tools for managing the research publications (e.g., "create," "modify," and "delete"). On the other hand, if the user is authenticated as a regular user, the screen only includes functions that do not require administrative login.

Figure 13:
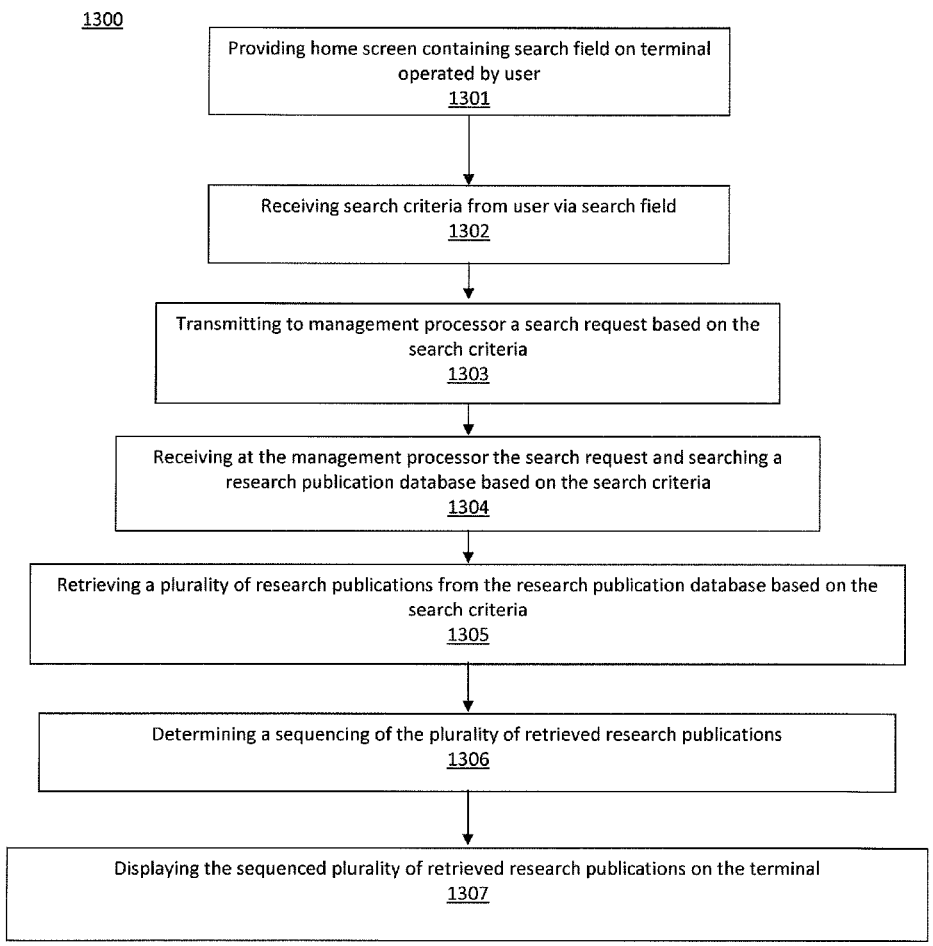
FIG. 13 shows a work flow of a method for presenting search results, according to one embodiment of the disclosure.

With reference to FIG. 13, shown is a work flow of a method for conducting a search and displaying a search results list [1300], according to one exemplary embodiment.

Step 1301 comprises providing a screen containing a search field and a search request functionality on a terminal operated by a user. Step 1302 comprises receiving, via the search field, search criteria from a user and receiving, via the search request functionality, a request to conduct a search based on the search criteria. When the terminal processor [111] receives from the client interface a request to conduct a search based on specified search criteria, in step 1303 the terminal processor [111] requests a search from the management processor [129] based on the search criteria. In step 1304 the management processor receives the search request and searches a research publication database based on the search criteria. Step 1305 comprises retrieving a plurality of research publications from the research publication database according to the search criteria. Step 1306 comprises determining a sequencing of the plurality of retrieved research publications. For example, at least one of the terminal processor [111] or the management processor [129] may configure (e.g., manage the sequence) of the results list for display at the user terminal [101]. Step 3107 comprises displaying the sequenced plurality of retrieved research publications on the terminal. In some embodiments, the management processor [129] transmits the results list to the terminal processor [111], which displays the results list to the user at the terminal [101].

Referring back to step 1306, in embodiments, the management processor [129] and/or the terminal processor [111] may sequence the list of retrieved research publications according various criteria. For example, the management processor [129] and/or the terminal processor [111] may sequence the list of retrieved research publications according to dates the research publications were published and/or according to dates the research publications were saved to the research publication database [105]. In some embodiments, the management processor [129] and/or the terminal processor [111] may sequence the list of retrieved research publications according to other research publications stored in the user's library.

In some embodiments, the list of retrieved publications may be sequenced based on the user interests. For example, the list of retrieved research publications may be configured based on user interest criteria inputted on the user account screen. Thus, if a user indicated on the user account screen a particular author as a user interest, then the application may present a retrieved publication written by the author towards the top of the list. Similarly, if a user indicated on the user account screen a particular research collaboration as a user interest, then the application may present a retrieved publication written by an author associated with the research collaboration towards the top of the list. In making the sequence determination, the application may also take into account relevancy of the article based on the search criteria, date of the publication, or any other factors.

In some embodiments, a user may specify (e.g., through user preferences) whether he or she would like certain user interests considered during the sequencing determination. For example, the user may be interested in publications written by particular authors for some searches but not for others. Thus, the application may provide the user with the ability to customize each search according to the user's interests and needs.

In some embodiments, the research publications stored in the database [105] may have data-tags designating particular criteria to which the publications relate. Thus, the list may be sequenced according to tags assigned to the list's research publications. For example, a research publication may have a data-tag indicating that it is associated with a particular scientific discipline, a data-tag indicating that it was written by a particular author, a data-tag indicating that it was conducting in a particular laboratory, and several data-tags indicating various research topic areas to which the article relates. The research publication may also have several data-tags indicating various key terms that are contained in or associated with the research publication.

Upon an initiation of a search, the application may scan the database [105] and retrieve publications having one or more data-tags that match, correspond to, and/or are associated with the user search criteria input.

In some embodiments, the data-tags may be assigned to a publication by an administrator or by a user. For example, as an administrator or user is uploading a research publication to the database from a source, the user may enter input that operates to assign data-tags to the uploaded publication. For example, before the publication is uploaded, the user may be asked to input data indicating the scientific discipline, author, laboratory, research collaboration, research topics, etc. that are associated with the research publication. In other embodiments, the application may be configured to automatically determine and assign data-tags to a publication, for example, by parsing the text of the research publication.

In some embodiments, the application may enable a user to designate user-favorites. For example, in some embodiments, a user may designate (e.g., via the user interests functionality [117]) particular interests and/or interest categories (e.g., research discipline, laboratory, author, etc.) as "favorite interests." In some embodiments, a user may designate (e.g., via the library management functionality [121]) research publications in the user's library as "favorite publications." In some embodiments, when searching the database [105], the application may base the search on the user's designated user-favorites. For example, in some embodiments, when searching the database [105] and comparing data-tags of publications contained in the database [105] with interest criteria designated by the user, the application may give weight only to interests and/or interest categories that are designated as a "favorite." In other embodiments, when searching the database [105], the application may give weight to all interests and/or interest categories but apply more weight to those that are designated as "favorites." In some embodiments, when searching the database [105] and comparing data-tags of the other user's library to data-tags stored in the database [105], the application may give weight only to data-tags assigned to publications stored in the database that are designated as a "favorites." In other embodiments, when searching the database, the application may give weight to data-tags assigned to all publications stored in the database but may give more weight to those that are assigned to publications designated as "favorites."

In some embodiments, the application may retrieve publications based on the search criteria as well as on publications stored in the user's library.

In some embodiments, when basing the retrieval on research publications in the user's library, the application may compare data-tags assigned to publications stored in the database and data-tags assigned to publications stored in the user's library. As explained above, data-tags may be assigned by a user to the research publications while the user is saving the research publications in the user's library. Data-tags may also be assigned to research publications independent of user input. Thus, upon a user saving a research publication his or her library, the assigned data-tags may be stored along with the research publications. As such, when conducting a search, the library management apparatus [104] may scan the database and retrieve research publications containing one or more data-tags that match, correspond to, and/or are associated with the data-tags in the user's library. In some embodiments, the application may also retrieve publications containing one or more data-tags that match, correspond to, and/or are associated with the user search criteria input.

In the implementation of the multi-variable search and display features, one skilled in the art will appreciate that any value of relative weights and priorities may be given to each variable (search criteria, interest criteria, library content, and/or tags) while remaining in the scope of the present disclosure.

Figure 14:
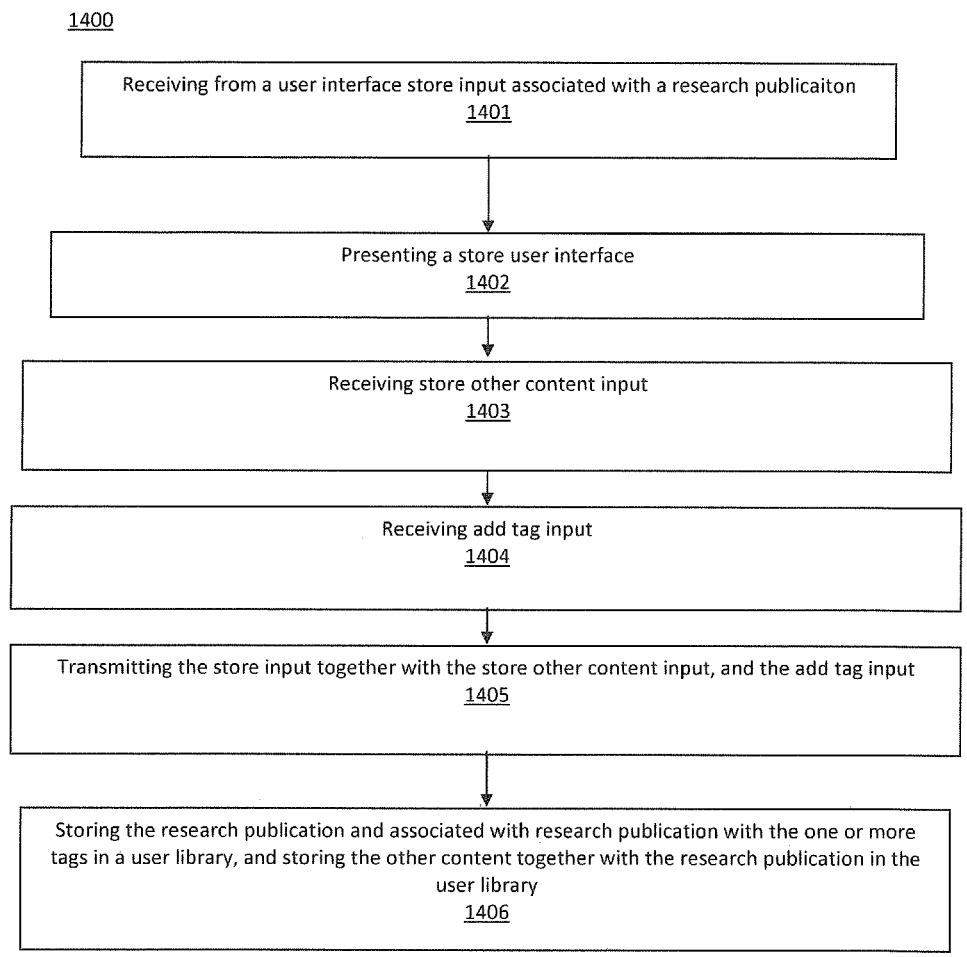
FIG. 14 shows a work flow of a method for saving a research publication, according to one embodiment of the disclosure.

With reference to FIG. 14, shown is a work flow of a method for saving a research publication together with other content and/or tags 1400, according to one exemplary embodiment. Step 1401 comprises receiving a user's store input from a search results screen. Step 1402 comprises presenting a store user interface to the terminal's display unit. As explained supra with reference to FIG. 6, the store user interface may provide the user with the option to store in the user's library other content together with the research publication and/or associate in the user's library the stored research publication with one or more tags. Thus, the step of presenting a store user interface may comprise, presenting an "upload my PDF" button and/or presenting an "add tag" input field to the terminal display unit. As such, in the particular embodiment shown in FIG. 14, the method includes step 1403 comprising receiving store other content input from the user, and step 1404 comprising receiving add tag input from the user.

Step 1405 comprises transmitting store input, add tag input, and store other content input. For example, when the terminal processor [111] receives from the client interface a request to save a research publication, the terminal processor [111] requests save permission from the management processor [129] to save the research publication to the user's library. In doing so, the terminal processor [111] may also request save permission for saving other content (e.g. PDF documents) together with the research publication. Alternatively or additionally, the terminal processor may request to associate one or more tags with the research publication. Upon receiving the save request, the management processor [129] returns the requested save permission back to the terminal processor and thereby saves the research publication to the user's library. Step 1406 comprises storing the research publication and associating the research publication to the one or more tags in the user's library, and storing the other content together with the research publication in the user's library.

Figure 15:
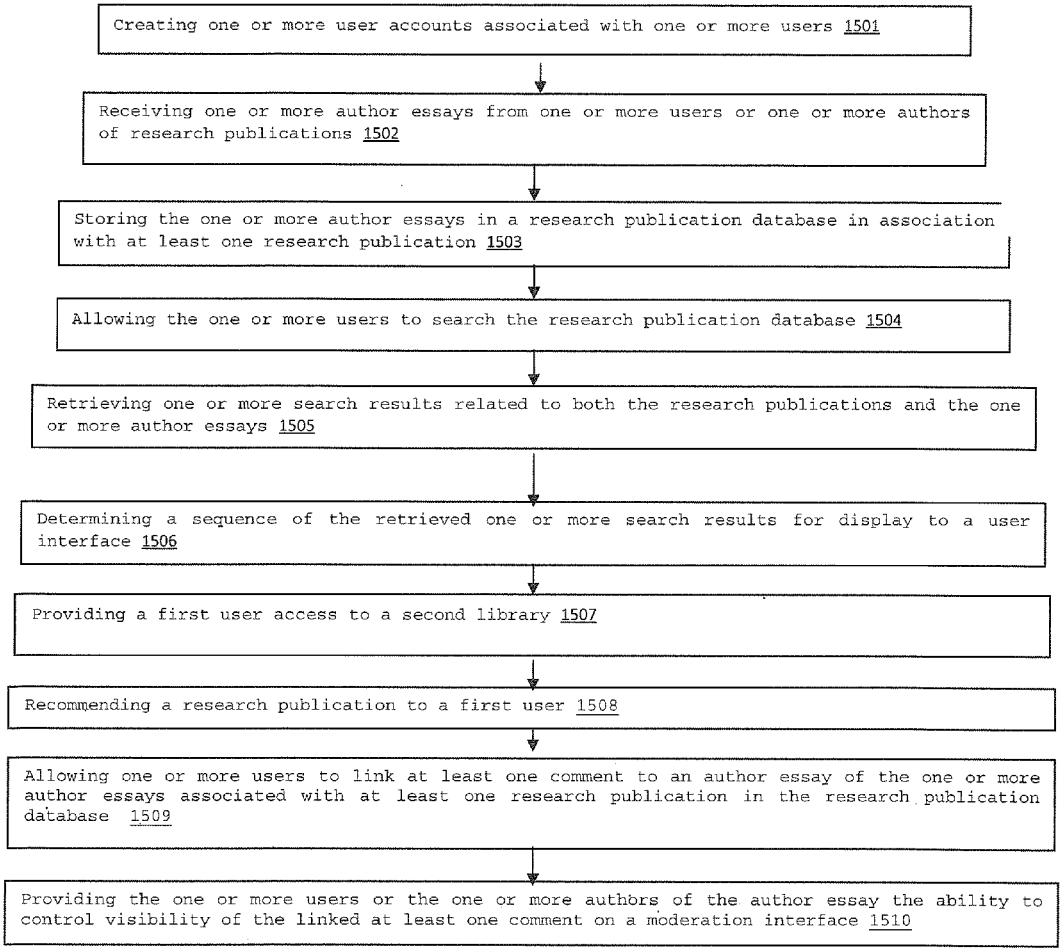
FIG. 15 shows a work flow for providing dynamic interaction with a research database, according to one embodiment of the disclosure.

1. With reference to FIG. 15, shown is a work flow of a method 1500 executed by the library management application [113] for providing dynamic interaction with a research publication database, according to one embodiment. Step 1501 comprises creating one or more user accounts associated with one or more users. Step 1502 comprises receiving one or more author essays from one or more users or one or more authors of research publications. Step 1503 comprises storing the one or more author essays in the research publication database in association with at least one research publication. Step 1504 comprises allowing the one or more users to search the research publication database. Step 1505 comprises retrieving one or more search results related to both the research publications and the one or more author essays. Step 1506 comprises determining a sequence of the retrieved one or more search results for display to a user interface. In some embodiments, each user of the one or more users has a separate library that contains a plurality of research publications having a plurality of features associated therewith, wherein each of the plurality of research publications is associated with at least one of the plurality of features, and wherein for each user of the one or more users, the sequence is determined based on at least one feature of the plurality of features associated with the plurality of research publications in the user's library. Step 1507 comprises providing a first user access to a second library. In some embodiments, the first user is associated with a first library and a second user associated with the second library, wherein the first user is provided access to the second library for at least one of viewing content stored in the second library, copying content stored in the second library for storage to the first library, or downloading content stored in the second library to the first library. In some embodiments, the first library contains a first plurality of research publications associated with a first plurality of features and the second library contains a second plurality of research publications associated with a second plurality of features, and the access is provided based on determining that a predetermined amount of the first plurality of features at least one of match, correspond to, or are associated with the second plurality of features. Step 1508 comprises recommending a research publication to a first user. In some embodiments, the first user is associated with a first library containing a first plurality of research publications associated with a first plurality of features. In some embodiments, the recommending comprises determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features, determining that a research publication of the second plurality of research publications is contained in a predetermined amount of the plurality of second libraries and is not contained in the first library, and recommending the research publication to the first user based on the recommendation. In some embodiments, one or more of the second plurality of features that match, correspond to, or are associated with the first plurality of features are related to at least one of authors of research publications or authors of author essays stored in the first library. Step 1509 comprises allowing one or more users to link at least one comment to an author essay of the one or more author essays associated with at least one research publication in the research publication database. In some embodiments, allowing the one or more users to link at least one comment is based on determining a first plurality of features associated with the research publication in the research publication database and associated with the author essay, for each user of the one or more users, determining a second plurality of features associated with the plurality of research publications contained in the user's library, and determining that a predetermined amount of second features at least one of match, correspond to, or are associated with the first plurality of features. Step 1510 comprises providing the one or more users or the one or more authors of the author essay the ability to control visibility of the linked at least one comment on a moderation interface.

What is claimed is:

1. A research publication library management system comprising:

a library management apparatus for communicating through a network with a terminal operable by one or more users, the terminal including a first non-transitory storage medium embodying an application, a processor for executing the application, and a display unit, wherein the library management apparatus includes a second non-transitory storage medium embodying one or more programs of instructions executable by one or more processing units in the library management apparatus to configure the library management apparatus to comprise:

a user account part that creates one or more user accounts associated with the one or more users;

a publication collection part that creates a research publication database by at least one of storing research publications or linking to third party sources that include the research publications;

an author essay part for allowing the one or more users or one or more authors of the research publications to provide one or more author essays relating to at least one of the research publications and storing the one or more author essays in the research publication database, wherein each of the one or more essays is stored in association with at least one of the research publications;

a search part that allows the one or more users to search the research publication database and retrieves one or more search results related to both the research publications and the related one or more author essays;

a moderation part for allowing the one or more users or one or more authors of the research publications to link at least one comment to an author essay of the one or more author essays associated with at least one research publication in the research publication database, wherein the author essay and said at least one comment linked to the author essay is communicated through the network to be displayed via the display unit of the one or more terminals to enable communication between the one or more users and/or the one or more authors regarding said at least one comment linked to the author essay; and a library management part for managing one or more user libraries associated with the one or more users, wherein the research publications and the one or more author essays are storable in the one or more user libraries; or an advisory part including a scientific mentor designating part that designates as scientific mentors at least one of the one or more users based on their qualifications;

a commenting part included in the advisory part that allows the one or more users to anonymously submit one or more questions to at least one of the one or more designated scientific mentors and for allowing at least one of the one or more designated scientific mentors to answer the one or more questions, wherein each of the anonymously submitted one or more questions and the answers to the one or more questions is communicated through the network to be displayed via the display unit; and a feedback part included in the advisory part that allows the one or more users to provide feedback regarding content of the one or more submitted answers, wherein the feedback is communicated through the network to be displayed via the display unit.

2. The research publication library management system as claimed in claim 1, wherein the library management apparatus comprises a search results configuration part for determining a sequence of the retrieved one or more search results for display to the display unit, wherein each user of the one or more users has a separate library that contains a plurality of research publications having a plurality of features associated therewith, wherein each of the plurality of research publications is associated with at least one of the plurality of features, and wherein for each user of the one or more users, the sequence is determined based on at least one feature of the plurality of features associated with the plurality of research publications in the user's library.

3. The research publication management system as claimed in claim 1, wherein the one or more users comprises a first user associated with a first library and a second user associated with a second library, wherein the library management apparatus comprises a community part for providing the first user access to the second library for at least one of viewing content stored in the second library, copying content stored in the second library for storage to the first library, or downloading content stored in the second library to the first library, wherein the first library contains a first plurality of research publications associated with a first plurality of features and the second library contains a second plurality of research publications associated with a second plurality of features, and wherein the access is provided based on determining that a predetermined amount of the first plurality of features at least one of match, correspond to, or are associated with the second plurality of features.

4. The research publication management system as claimed in claim 1, wherein the one or more users comprises a first user associated with a first library containing a first plurality of research publications associated with a first plurality of features, wherein the library management apparatus comprises a recommendation part for:

determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features, determining that a research publication of the second plurality of research publications is contained in a predetermined amount of the plurality of second libraries and is not contained in the first library, and recommending the research publication to the first user.

5. The research publication management system as claimed in claim 4, wherein one or more of the second plurality of features that match, correspond to, or are associated with the first plurality of features are related to at least one of authors of research publications or authors of author essays stored in the first library.

6. The research publication library management system as claimed in claim 1, wherein each user of the one or more users has a separate library that contains a plurality of research publications having a plurality of features associated therewith, wherein the moderation part is configured to:

determine a first plurality of features associated with the research publication in the research publication database and associated with the author essay, for each user of the one or more users, determine a second plurality of features associated with the plurality of research publications contained in the user's library, and allow the user to link a comment based on determining that a predetermined amount of second features at least one of match, correspond to, or are associated with the first plurality of features.

7. The research publication library management system as claimed in claim 6, wherein the moderation part provides the one or more users or the one or more authors of the author essay the ability to control visibility of the linked at least one comment on a moderation interface.

8. The research publication library management system as claimed in claim 1, wherein the library management apparatus comprises an advisory part for allowing the one or more users to post questions and answers to the questions.

9. The research publication library management system as claimed in claim 8, wherein the advisory part is configured to store the questions and answers in a database and configured to allow the one or more users to search for the questions and answers in the database.

10. A library management application including one or more programs of computer-executable instructions embodied in a non-transitory computer-readable storage medium executable by a processing unit of a terminal apparatus that includes a display unit, to configure the terminal apparatus to include:

a user account functionality for creating one or more user accounts associated with one or more users;

an author essay functionality for allowing the one or more users or one or more authors of research publications stored in a research publication database to provide one or more author essays relating to at least one of the research publications and storing the one or more author essays in the research publication database, wherein each of the one or more author essays is stored in association with at least one of the research publications;

a search functionality for searching the research publication database and retrieving one or more search results related to both the research publications and the related one or more author essays;

a moderation functionality for allowing the one or more users or one or more authors of the research publications to link at least one comment to an author essay of the one or more author essays associated with at least one research publication in the research publication database, wherein the author essay and said at least one comment linked to the author essay is communicated through the network to be displayed via the display unit of the terminal to enable communication between the one or more users and/or the one or more authors regarding said at least one comment linked to the author essay; and
a library management functionality for managing one or more user libraries associated with the one or more users, wherein the research publications and the one or more author essays are storable in the one or more user libraries; or
an advisory functionality including a scientific mentor designating functionality for designating as scientific mentors at least one of the one or more users based on their qualifications;
a commenting functionality included in the advisory functionality for allowing the one or more users to anonymously submit one or more questions to at least one of the one or more designated scientific mentors and for allowing at least one of the one or more designated scientific mentors to answer the one or more questions, wherein each of the anonymously submitted one or more questions and the answers to the one or more questions is communicated through the network to be displayed via the display unit; and
a feedback functionality included in the advisory functionality for allowing the one or more users to provide feedback regarding content of the one or more submitted answers, wherein the feedback is communicated through the network to be displayed via the display unit.

11. The library management application as claimed in claim 10, wherein the library management applications comprises a search results configuration functionality for determining a sequence of the retrieved one or more search results for display to the display unit,
wherein each user of the one or more users has a separate library that contains a plurality of research publications having a plurality of features associated therewith, wherein each of the plurality of research publications is associated with at least one of the plurality of features, and
wherein for each user of the one or more users, the sequence is determined based on at least one feature of the plurality of features associated with the plurality of research publications in the user's library.

12. The library management application as claimed in claim 10, wherein the one or more users comprises a first user associated with a first library and a second user associated with a second library, wherein the library management application comprises a community library functionality for providing the first user access to the second library for at least one of viewing content stored in the second library, copying content stored in the second library for storage to the first library, or downloading content stored in the second library to the first library,
wherein the first library contains a first plurality of research publications associated with a first plurality of features and the second library contains a second plurality of research publications associated with a second plurality of features, and wherein the access is provided based on determining that a predetermined amount of the first plurality of features at least one of match, correspond to, or are associated with the second plurality of features.

13. The library management application as claimed in claim 10, wherein the one or more users comprises a first user associated with a first library containing a first plurality of research publications associated with a first plurality of features,
wherein the library management application comprises a recommendation part for:
determining a plurality of second libraries associated with a plurality of second users of the one or more users, the plurality of second libraries containing a second plurality of research publications associated with a second plurality of features, based on determining that a predetermined amount of the second plurality of features at least one of match, correspond to, or are associated with the first plurality of features,
determining that a research publication of the second plurality of research publications is contained in a predetermined amount of the plurality of second libraries and is not contained in the first library, and
recommending the research publication to the first user.

14. The library management application as claimed in claim 13, wherein one or more of the second plurality of features that match, correspond to, or are associated with the first plurality of features are related to at least one of authors of research publications or authors of author essays stored in the first library.

15. The library management application as claimed in claim 10, wherein each user of the one or more users has a separate library that contains a plurality of research publications having a plurality of features associated therewith,
wherein the moderation functionality is configured to:
determine a first plurality of features associated with the research publication in the research publication database and associated with the author essay,
for each user of the one or more users, determine a second plurality of features associated with the plurality of research publications contained in the user's library, and allow the user to link a comment based on determining that a predetermined amount of second features at least one of match, correspond to, or are associated with the first plurality of features.

16. The library management application as claimed in claim 15, wherein the moderation functionality provides the one or more users or the one or more authors of the author essay the ability to control visibility of the linked at least one comment on a moderation interface.

17. The library management application as claimed in claim 10, further comprising an advisory functionality for allowing the one or more users to post questions and answers to the questions.

18. The library management application as claimed in claim 17, wherein the advisory functionality allows users to provide feedback to previously-posted answers.

19. The library management application as claimed in claim 18, wherein the feedback is a quality score.

20. A method performed by a library management application including one or more programs of computer-executable instructions embodied in a non-transitory computer-readable storage medium executable by a processing unit of a terminal apparatus that includes a display unit, the library management application executing in a library publication management system including one or more processing units, said method comprising:

creating one or more user accounts associated with one or more users, wherein a library is associated with each of the one or more users;

receiving one or more author essays from one or more users or one or more authors of research publications;

storing the one or more author essays in a research publication database, wherein each of the one or more author essays is stored in association with at least one of the research publications;

allowing the one or more users to search the research publication database;

retrieving one or more search results related to both the research publications and the one or more author essays; and allowing the one or more users or one or more authors of the research publications to link at least one comment to an author essay of the one or more author essays associated with at least one research publication in the research publication database, wherein the author essay and said at least one comment linked to the author essay is communicated through the network to be displayed via the display unit of the one or more terminals to enable communication between the one or more users and/or the one or more authors regarding said at least one comment linked to the author essay; or designating as scientific mentors at least one of the one or more users based on their qualifications;

allowing the one or more users to anonymously submit one or more questions to at least one of the one or more designated scientific mentors, wherein each of the anonymously submitted one or more questions is communicated through the network to be displayed via the display unit;

allowing at least one of the one or more designated scientific mentors to answer the one or more questions, wherein each of the answers to the one or more questions is communicated through the network to be displayed via the display unit; and allowing the one or more users to provide feedback regarding content of the one or more submitted answers, wherein the feedback is communicated through the network to be displayed via the display unit.

* * * * *